United States Patent
Wyland

(10) Patent No.: US 9,853,545 B2
(45) Date of Patent: Dec. 26, 2017

(54) POWER REGULATOR HAVING CURRENT AND VOLTAGE MODES

(71) Applicant: Microsoft Technology Licensing, LLC, Redmond, WA (US)

(72) Inventor: David C. Wyland, Morgan Hill, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/754,996

(22) Filed: Jun. 30, 2015

(65) Prior Publication Data

US 2017/0005574 A1  Jan. 5, 2017

(51) Int. Cl.
*G01C 3/08* (2006.01)
*H02M 3/158* (2006.01)
*H02M 3/156* (2006.01)

(52) U.S. Cl.
CPC ........... *H02M 3/158* (2013.01); *H02M 3/156* (2013.01)

(58) Field of Classification Search
CPC .................................................... H02M 3/158
See application file for complete search history.

(56) References Cited

U.S. PATENT DOCUMENTS

| 3,319,080 A | 5/1967 | Comely et al. |
| 4,807,239 A | 2/1989 | Takano et al. |

(Continued)

FOREIGN PATENT DOCUMENTS

| CN | 203706008 U | 7/2014 | |
| DK | WO 2015128398 A1 * | 9/2015 | ............ H02M 3/155 |
| JP | 2002100832 A | 4/2002 | |

OTHER PUBLICATIONS

International Search Report and Written Opinion dated Sep. 12, 2016 in International Application No. PCT/US2016/037469.

(Continued)

*Primary Examiner* — Samantha K Abraham
(74) *Attorney, Agent, or Firm* — Rainier Patents, P.S.

(57) ABSTRACT

A power supply is configured to automatically and rapidly switch from a voltage maintaining mode to a current limiting mode (at times that are unpredictable from a point of view of the power supply) when supplying replenishing current to a combination of a power insulated gate switching device and power capacitor that drive relatively large surges of pulsed power through a load such as a laser emitter of a Time of Flight (TOF) determining system. The current limiting mode is automatically activated by the start of each train of large surges of pulsed power and it replenishes charge to the power capacitor on a time averaged basis such that the capacitor develops a temperature appropriate voltage for providing the time averaged current to the power insulated gate switching device and its load and causing the load (e.g., laser) to output a desired amount of output power. The current limiting mode automatically stops when the time averaged current is detected to drop below a threshold and then the voltage maintaining mode automatically begins. The voltage maintaining mode maintains a stored voltage across the capacitor slightly greater than a maximum voltage needed to drive the load (e.g., laser emitter) to the desired magnitude of output power (e.g., output luminance).

20 Claims, 12 Drawing Sheets

(56) References Cited

U.S. PATENT DOCUMENTS

| | | | |
|---|---|---|---|
| 5,276,671 A | 1/1994 | Minami et al. | |
| 5,966,394 A | 10/1999 | Spurr et al. | |
| 6,366,070 B1 | 4/2002 | Cooke | |
| 6,931,048 B2 | 8/2005 | Koshimae et al. | |
| 7,046,706 B2 | 5/2006 | Tatehara et al. | |
| 2006/0244430 A1 | 11/2006 | Hirabayashi | |
| 2007/0030868 A1 | 2/2007 | Sekigawa | |
| 2010/0244788 A1* | 9/2010 | Chen | H02M 3/1584 323/234 |
| 2011/0234107 A1* | 9/2011 | Simon | H01L 35/00 315/176 |
| 2011/0298918 A1 | 12/2011 | McEldowney | |
| 2012/0215216 A1 | 8/2012 | Friedrichs | |
| 2012/0294324 A1 | 11/2012 | Miyajima et al. | |
| 2014/0104592 A1 | 4/2014 | Tien et al. | |

OTHER PUBLICATIONS

Response to International Search Report and Written Opinion filed Oct. 25, 2016 in International Application No. PCT/US2016/037469.

Huiyun, et al., "Design of Dual Control and Dual Output Constant Current Source for Semi-Conductor Laser Diode", In Proceedings of 5th International Conference on Power Electronics Systems and Applications, Dec. 11, 2013, 4 pages.

"Laser Diode Current Source Module LDC—3916338 Manual", Retrieved on: Apr. 7, 2015, Available at: http://www.ilxlightwave.cn/manuals/laser_diode_current_source_module_LDC-3916338_manual.pdf.

"International Preliminary Report on Patentability Issued in PCT Application No. PCT/US2016/037469", dated Apr. 21, 2017, 07 Pages.

* cited by examiner

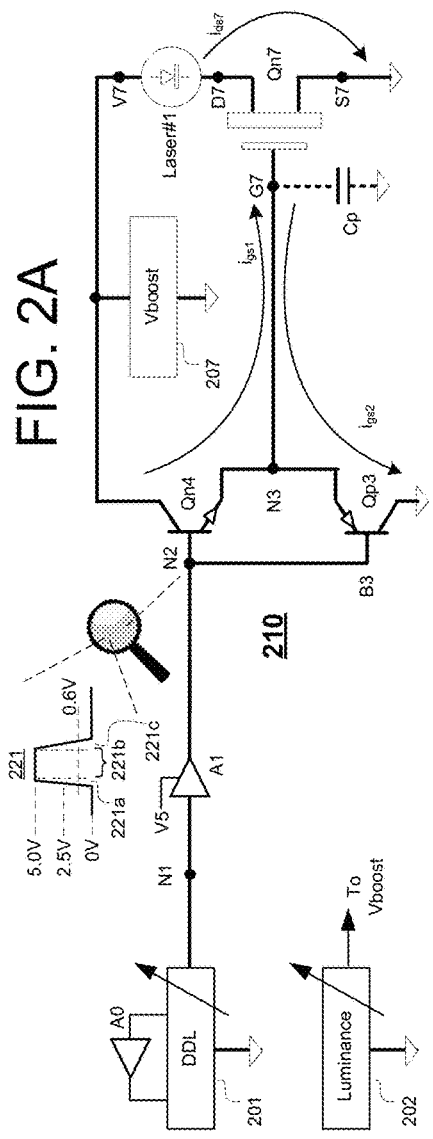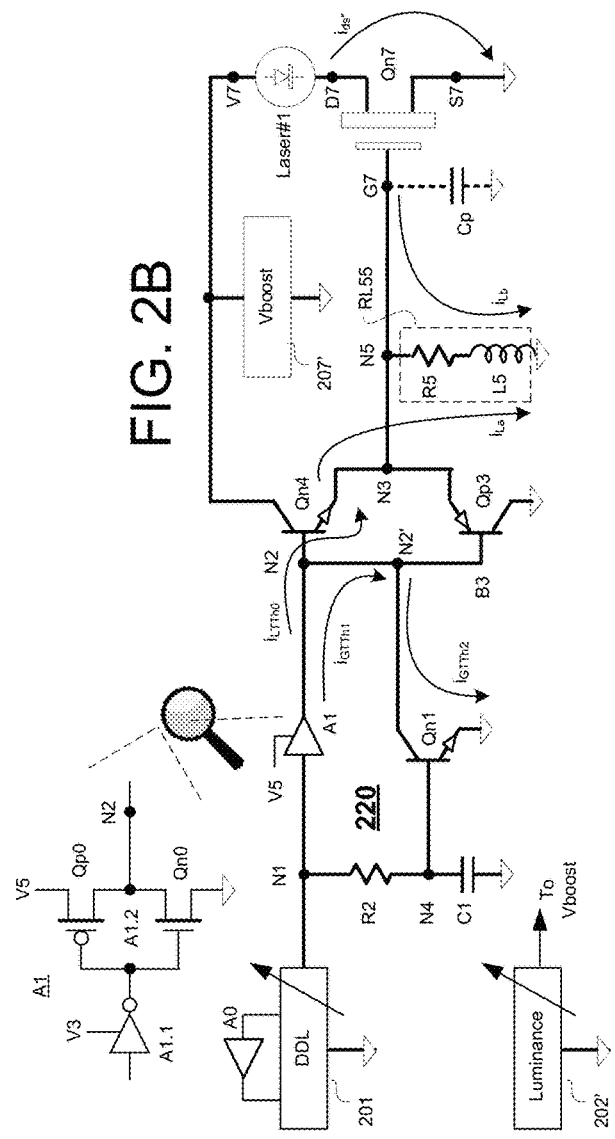

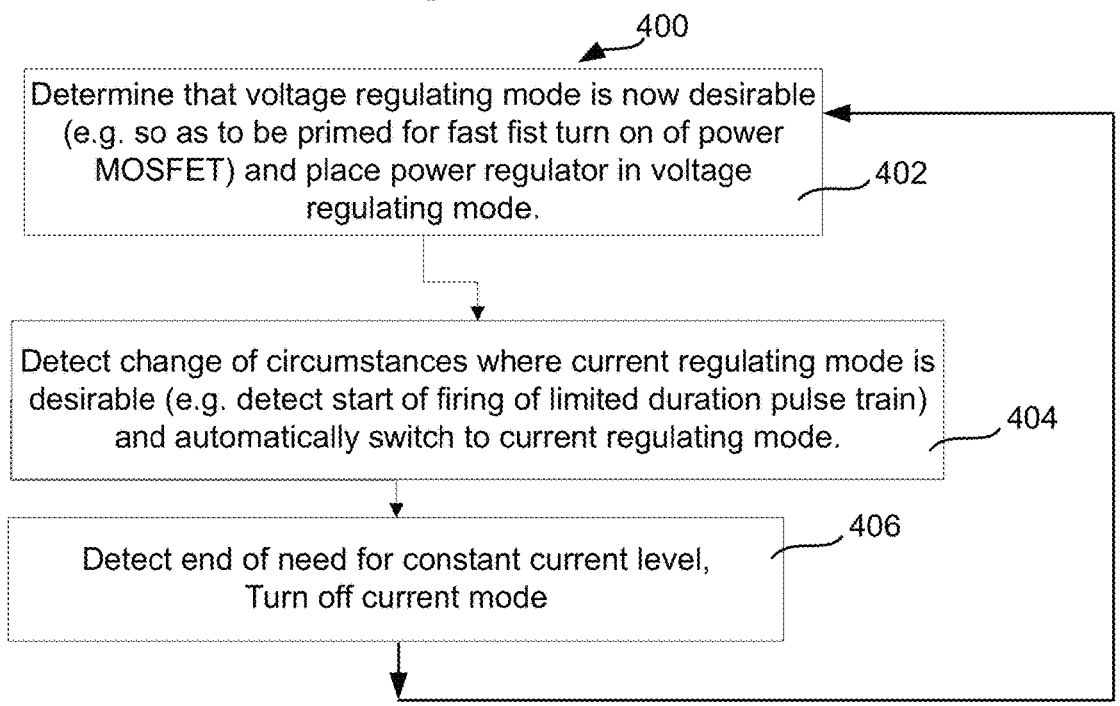
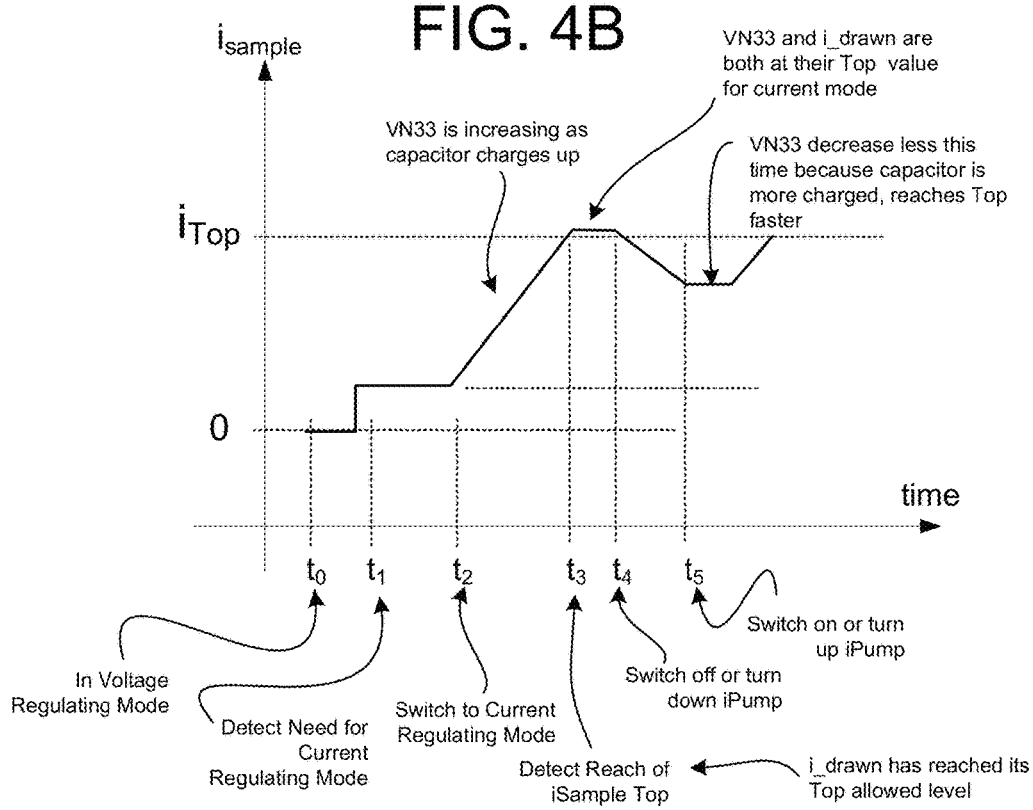

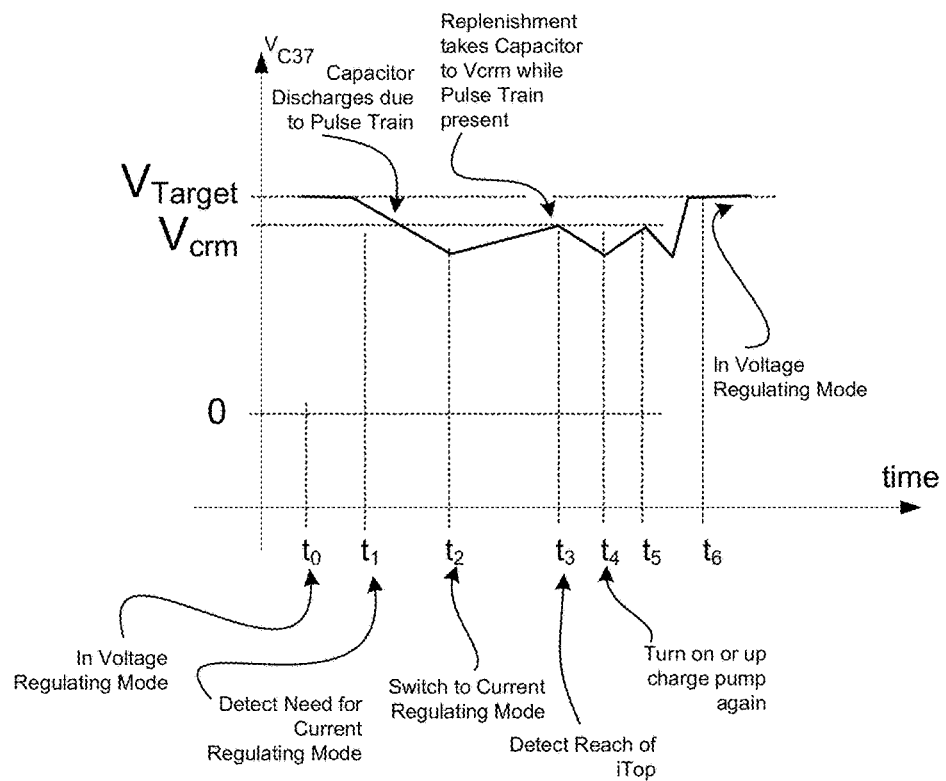
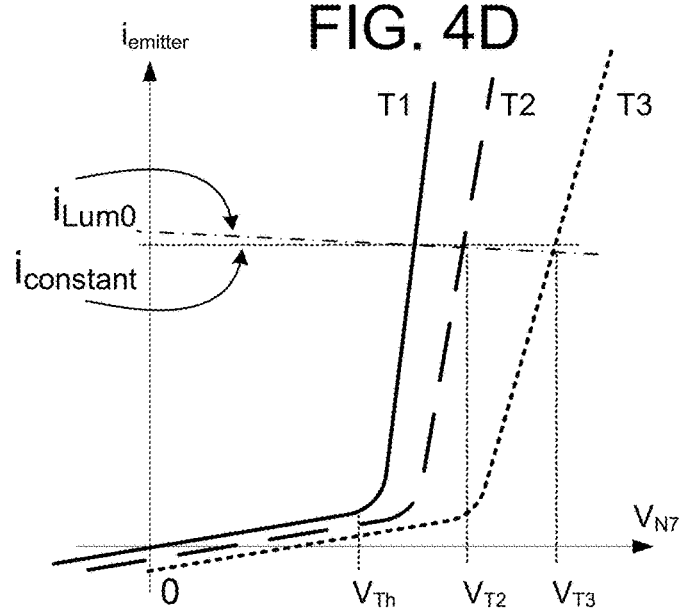

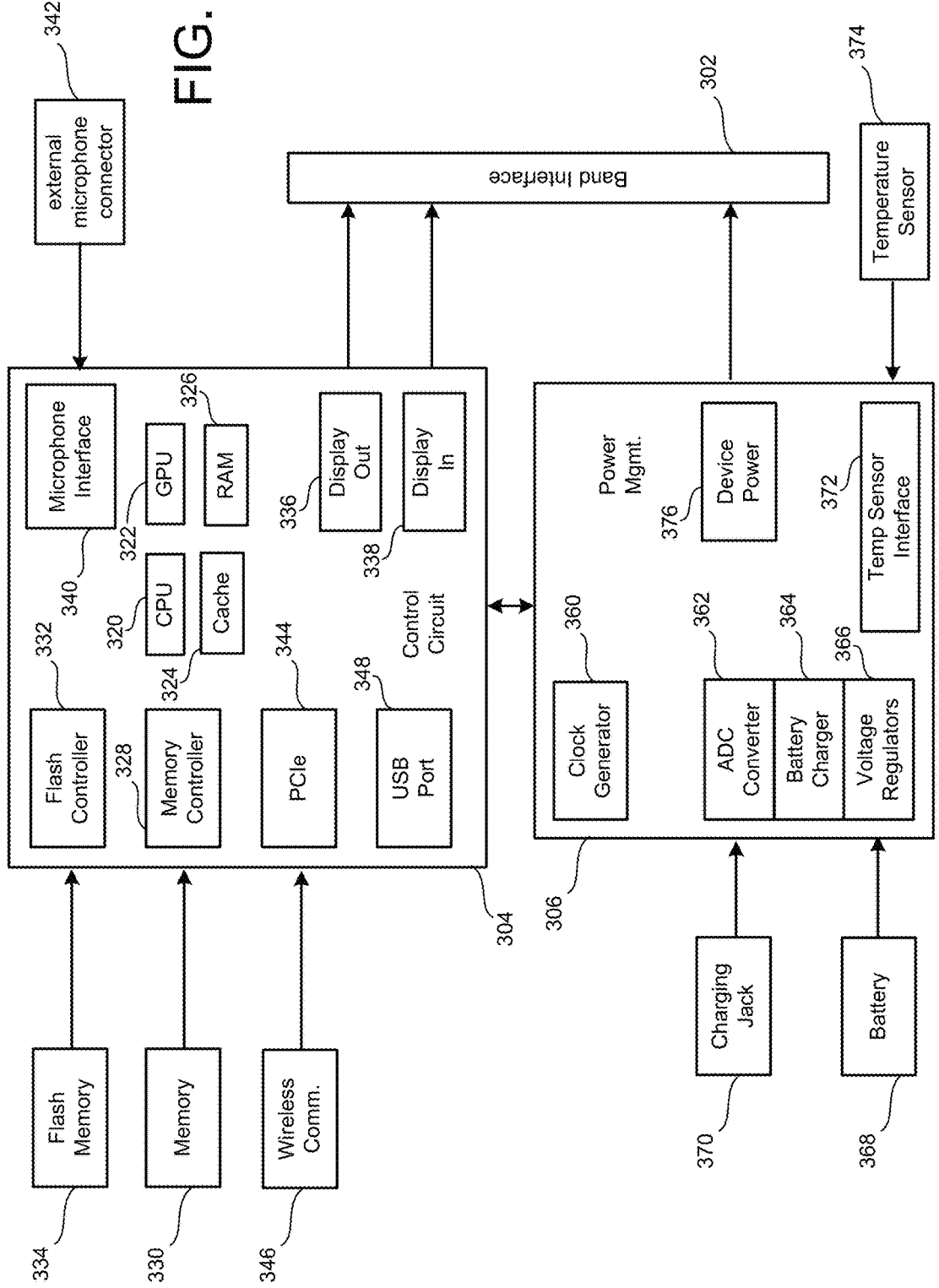

POWER REGULATOR HAVING CURRENT AND VOLTAGE MODES

BACKGROUND

Power supplies for powering digital and analog circuits are typically voltage regulated ones. When large surges of current are to be drawn at unpredictable times by an analog component (e.g., a laser diode), a predetermined voltage level of a voltage regulated power supply is typically applied to a relatively large charge storage capacitor, current surges are drawn from that large capacitor at the respective unpredictable times and then the voltage of the voltage regulated power supply is re-applied to thus replenish the capacitor by recharging it to the predetermined voltage level.

SUMMARY

In accordance with one aspect of the present disclosure, a dual mode regulated power supply is provided where the dual mode power supply has the ability to rapidly switch (e.g., at unpredictable times) from a voltage regulating mode to a current regulating mode in response to detection of an above threshold amount of current being drawn by a current consuming component.

In one embodiment, the current consuming component is one whose behavior varies significantly as a function of change in voltage and/or temperature but less so as a function of change in drive current. Thus it is desirable to drive such a voltage and/or temperature sensitive component (e.g., laser diode and/or other semiconductive device) in a current regulated mode rather than in a voltage regulated mode so as to more accurately control the behavior of the voltage/temperature sensitive component. The embodiment however, has other components that preferably operate on a voltage regulated basis. A dual mode regulated power supply is used to provide both voltage regulated power and current regulated power. Switching from the voltage regulating mode to the current regulating mode has to be performed with extreme rapidity because precise timing of activation of the current consuming component (e.g., laser diode) is important to the operability of the system (e.g., a TOF sub-system). A unique circuit arrangement is provided which allows a dual mode power regulator to rapidly switch from a voltage regulating mode to a current regulating mode. More specifically, in one embodiment, a high power insulated gate switching device (e.g., MOSFET) episodically draws larges surges of current (e.g., 0.5 Ampere surges, hereafter also 0.5 A pulses) from a nearby capacitor and uses the drawn current to drive relatively large surges of pulsed power through a semiconductive laser emitter of a Time of Flight (TOF) determining system. The capacitor is replenished with charge from a dual mode power supply that is at the time of current draw, rapidly switched into operating in current regulating mode. Use of the current regulating mode causes the capacitor to automatically converge on a voltage level corresponding to the then present temperature and the then supplied rate of replenishing charge. In other words, the capacitor automatically discovers the temperature appropriate voltage for itself without need for a temperature compensating circuit. In one embodiment, the insulated gate switching device (e.g., MOSFET) and light emitter (e.g., laser diode) are closely mounted to one another on a printed circuit board having further closely packed other components. Waveforms of pulse trains that control the insulated gate switching device (e.g., power MOSFET) are programmably defined to occur at time sensitive moments and may include pulse durations that cause substantial changes of local temperature. A method of sensing the moments when charge draw is needed and of rapidly switching into a current regulating mode is provided. Accordingly, irrespective of how temperature changes, an appropriate current level is automatically applied to the semiconductive light emitter for thereby outputting a desired luminance level or a desired luminance power value.

This brief Summary is provided to introduce a selection of concepts in a simplified form that are further described below in the Detailed Description. This brief Summary is not intended to identify key features or essential features of claimed subject matter, nor is it intended to be used as an aid in determining the scope of the claimed subject matter.

BRIEF DESCRIPTION OF THE DRAWINGS

FIG. 2A is a schematic diagram of a first circuit for turning on and off high powered components and in which turn-off time may be unduly lengthened.

FIG. 2B is a schematic diagram of a second circuit for rapidly turning on and off high powered components and in which on time is hardware limited.

FIG. 4A is a flowchart explaining a process in which a power supply control circuit switches between a voltage regulating mode and a current regulating mode.

FIG. 4B is a piecewise linear approximating graph that schematically illustrates changes in current flow in a power supply control circuit that switches between a voltage regulating mode and a current regulating mode.

FIG. 4C is a piecewise linear approximating graph that schematically illustrates changes in voltage of a capacitor that is charged by a power supply that switches between a voltage regulated mode and a current regulated mode.

FIG. 4D is an approximating graph that schematically illustrates how changes in temperature and/or voltage affect the output luminance of a semiconductive light emitter much more so than changes in current.

FIG. 7 is a block diagram of one embodiment of the hardware and software components of a processing unit associated with a see-through, near-eye, mixed reality display unit.

DETAILED DESCRIPTION

Figure 1A:
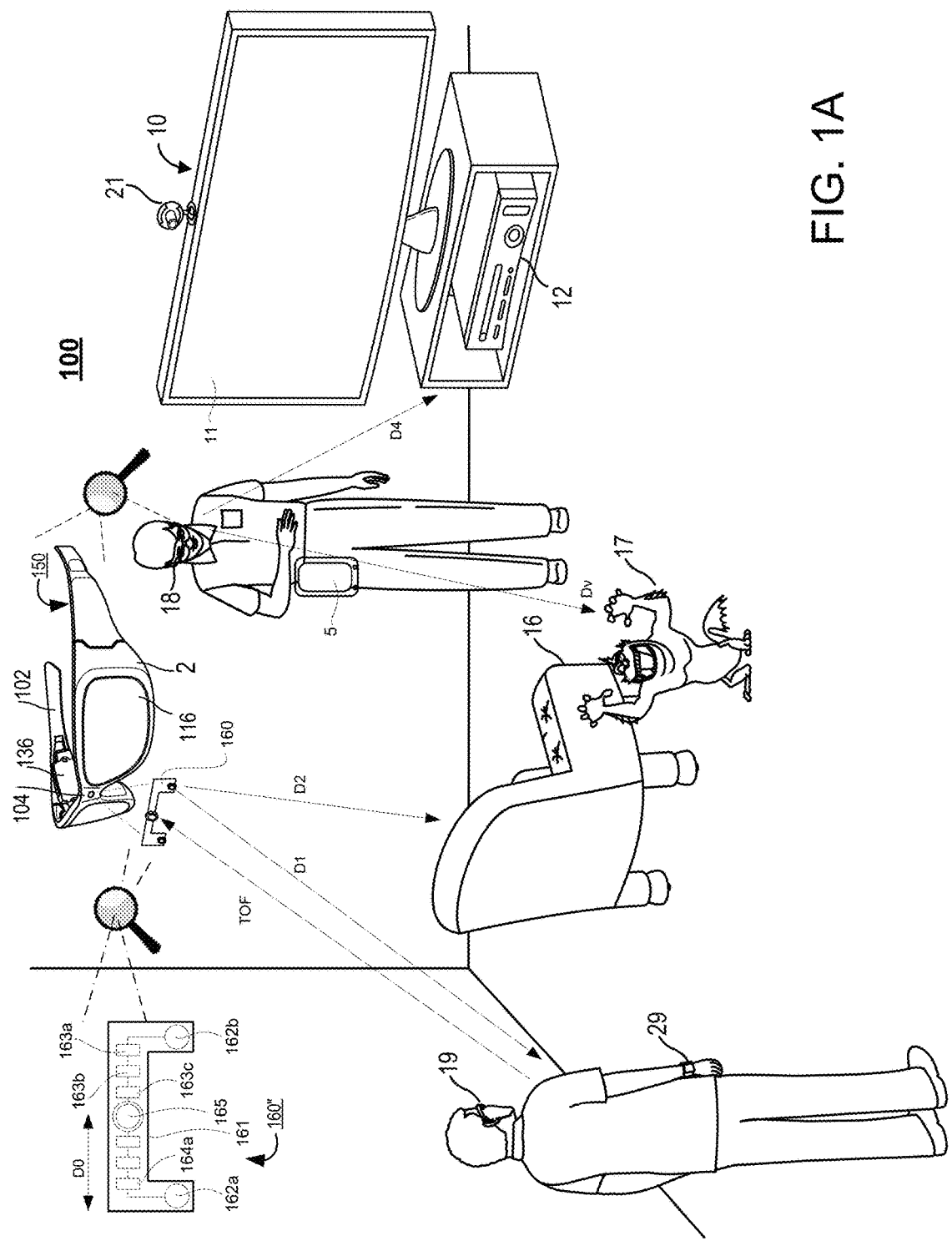
FIG. 1A depicts a see-through head mounted display device (HMD) embodiment having a TOF sub-system embedded therein for enabling distance determination for real objects in a field of view seen by a user wearing the see-through HMD.

One example of a circuit where large surges of current are episodically drawn (that is, at unpredictable times for the view point of the corresponding power supply) is a Time of Photonic Flight determining sub-system (also referred to as a TOF sub-system or LIDAR sub-system). In such a system, one or more light emitters (e.g., laser diodes) are used to episodically emit pulses of high intensity light for illuminating real objects in a user occupied space. TOF sub-systems may be used for example as part of a three-dimensional (3D) augmented reality system. In one variation, a pulsed photonic energy waveform corresponding to certain repetition frequencies and phases is produced as a series of time-bound bundles of photons with each bundle being output for example in the form of a short duration yet high intensity and substantially rectangular pulse of light preferably having steep rising and falling edges as well as a relatively narrow pulse width. More specifically, the per pulse, peak plateau width may desirably be on the order of about 50 nanoseconds (ns) or less as an example while the leading and trailing pulse edges of the pulse each desirably occupy no more than about 10 ns. The time it takes for the output pulses of photons to leave their emitter, travel through air to a reflective target and return to an appropriately sensitized sensor is referred to as the Time of Flight (TOF). Distance between the emitter/sensor pair and the target can be calculated as being TOF*C'/2 where C' is the speed of light in the transmission medium (e.g., air). Because high powered components are used for producing the pulses, local temperatures may rise and behavior characteristics (e.g., I-V characteristics) of temperature sensitive parts may vary. In particular, the behavior of semiconductive light emitters when driven by a fixed value drive voltage may vary significantly in response to temperature change. Also, the behavior of such semiconductive light emitters may vary significantly in response to voltage change. Measurement accuracy and/or resolution of the TOF sub-system may suffer if component behavior fluctuates as a result of temperature change or voltage change.

As briefly introduced in the Background section, power supplies for digital and analog circuits are typically voltage regulated ones. However, high power semiconductive light emitters such as laser diodes tend to have luminance versus drive behaviors that are more so voltage and temperature sensitive than they are current sensitive. In other words, a small change (e.g., 1%) in either voltage or temperature can substantially change luminance output. Variation of output luminance is much less if the semiconductive light emitter is driven by a constant current source. However, in cases where the semiconductive light emitter has to be rapidly switched on and off at unpredictable times (unpredictable from the point of view of the power supply), in other words, between a high current mode and a zero current mode, the use of a constant current source is problematic. For example it can be extremely wasteful of energy if the constant current output of a constant current source were to be shunted around rather than through the light emitter each time the emitter is to be shut off. Energy efficiency is much better when a capacitor is charged to an appropriate voltage and then is episodically discharged through the semiconductive light emitter when a pulse of light is to be output. However, a problem with the capacitor discharge configuration is that the voltage needs to be changed in response to temperature changes if relatively constant luminance is to be provided. Use of temperature detection and compensating circuitry has its own set of problems. It would be advantageous if reliance on direct temperature detection could be avoided.

When a consistently fast turn on of a semiconductive light emitter is desired, there can be a minimum voltage that is needed (e.g., a floor voltage greater than 5 volts) for quickly charging RC or RLC circuits associated with switching elements (e.g., an in-series high power insulated gate switching device such as a power MOSFET) that are used for rapidly turning on the corresponding light emitter (e.g., laser diode). Thus a power regulator should be provided that, on one hand provides the minimal floor voltage (e.g., greater than 5V, and in one embodiment, greater than 7V) and yet on the other hand, overcomes the voltage and temperature sensitivity problems of semiconductive light emitters (and/or other semiconductive loads) in order to produce photonic pulses with steep leading edges and consistency for the desired light intensity.

An example of an application where it is desirable to assure that a high power semiconductive light emitter such as a laser diode is consistently outputting a desired intensity of light (e.g., a predetermined luminance or a predetermined level of optical power at a predetermined wavelength) is a Time of Photonic Flight determining sub-system (also referred to as a TOF sub-system) as used for example in a three-dimensional (3D) augmented reality system. Specific examples of systems in which a TOF sub-system may be embedded include mixed-reality Head Mounted Display (HMD) systems in which a TOF emitter/sensor pair is mounted on a stand alone HMD and used for measuring distance between the user's head and HMD pointed-to real objects that are both near and far away in the user's immediate surroundings (e.g., a 30 foot by 30 foot room). These measured distances are then used by appropriate data processing means (e.g., on-board and/or external electronic signal processing means) to construct in real-time a three-dimensional (3D) mapping of real objects surrounding the user. The mapped real objects are then modeled as existing in an XYZ reference frame where Z is depth distance between the user and an in-field-of-view XY plane orthogonal to the Z direction. The XYZ frame may be filled with real objects and one or more superimposed virtual objects. An illusion of 3D stereoscopic vision may be created by using a differentiated pair of see-through binoculars where there is a separate, electronically-driven and optically superimposing imaging sub-system for each of a user's two eyes when viewing an augmented reality scene. The term Augmented Reality (AR) is used to refer to displaying an augmented real-world environment where the perception of the real-world environment (or image data representing the real-world environment) is augmented or modified with addition of computer-generated virtual image data. An AR environment may be used to enhance numerous applications including single or multi-user real-time video gaming, real-time mapping, navigation, and various real-time mobile device applications.

When a TOF sub-system is to be used for providing high resolution distance measurement (e.g., on the order of centimeters) over a wide range of distances it is desirable to have: (1) high powered pulses of photonic energy of an appropriate wavelength (e.g., outside the visible spectrum); (2) very steep leading and trailing pulse edges (e.g., less than 10 ns each); (3) precise synchronization between the electronic drive signals of the optical energy emitter (e.g., an IR laser diode) and the optical return sensor (e.g., an IR sensing, gate-able CCD array of pixels); (4) flexibility in defining waveforms of the high powered pulses of photonic energy; (5) longevity and reliability for high powered components that produce the high powered pulses of photonic energy; and (6) consistent performance even as temperature changes and/or the fabrication process of the utilized light emitters (e.g., laser diodes) and their direct drive switches (e.g., power MOSFETs) changes or resistances of electrical contacts and wires change (e.g., due to corrosion or vibration).

Unfortunately, there are a number of impediments to realizing all these desirable features including that semiconductive light emitters are sensitive to temperature change and voltage change, that unexpected voltage drops may appear across contacts and/or wirings that conduct strong currents, that semiconductive light emitters which are produced by various manufacturers and/or by separate batch fabrication processes may exhibit different luminance (Lum) versus current (I) versus voltage (V) versus temperature (T) characteristics (hereafter also I-V-T characteristics), that during use and where flexible software control is allowed for digitally controlling power MOSFETs that drive high powered optical emitters (e.g., one or more IR laser diodes), such flexibility can also allow for excessively (undesirably) prolonged turn on of the high powered optical energy emitters or unduly short off times between the pulses such that overheating can occur and damage the high powered components and/or change their I-V-T characteristics.

FIG. 1A presents an exemplary environment 100 in which a see-through head mounted display device (st-HMD) having a TOF sub-system embedded therein is used for enabling distance determination for real objects in a field of view seen by a user wearing the see-through HMD.

More specifically, FIG. 1A schematically depicts a multi-user environment 100 in which a first user 18 wears a respective first head mounted device (shown magnified at 150) and sees by way of partial see-through functionality of the HMD 150 an augmented reality surrounding that includes both real objects and virtual objects. The real objects may include a chair 16, a hub computing system 10 and a wide sized display 11 disposed relatively close to the first user 18. A real second user 19 is depicted as being positioned farther away from the first user 18. The virtual objects in the augmented reality surrounding may include a virtual monster 17 which is three-dimensionally positioned in front, behind and/or between various ones of the real objects and differently relative to the two users. For example, computer generated image data may cause the virtual monster 17 to appear as overlaid besides the real chair 16 when perceived through selective see-through lenses of the first HMD 150. The second user 19 may wear his own and respective second HMD and perceive things differently based on relative distances between himself and real and virtual objects within the augmented reality environment 100. In the illustrated example, a first distance between the worn first HMD 150 of the first user 18 and the second user 19 is denoted as D1. A second distance between the worn first HMD 150 and the real chair 16 is denoted as D2. A third distance between the worn first HMD 150 and the virtually superposed monster 17 is denoted as Dv while a fourth distance between the worn first HMD 150 and a real furniture stand on which real display 11 is mounted is denoted as D4.

A Time of Flight (TOF) sub-system 160 is mounted to an upper frame portion of the HMD 150 and used for determining in real-time the various real distances (e.g., D1, D2, D4) between the first user's head and surrounding real objects. The determined real distances may be used in combination with determined head orientation to electronically construct in real-time a three-dimensional (3D) mapping of real objects surrounding the user. The latter data is then used to electronically construct in real-time a stereoscopic image of the virtually superposed monster 17 as appropriately sized and positioned relative to the viewable other objects in the mixed reality environment 100. User experience and a sense of realism may be enhanced when the various real distances (e.g., D1, D2, D4) are accurately determined. In one embodiment, the various real distances (e.g., D1, D2, D4) determinable by the Time of Flight (TOF) sub-system 160 are in a range of 1 foot away from the corresponding HMD (e.g., 150) to 30 feet away from the corresponding HMD. In one embodiment, the various real distances determinable by the TOF sub-system 160 are in a range of 6 inches away from the corresponding HMD to 50 feet away from the corresponding HMD.

The illustrated hub computing system 10 may include a computing apparatus 12, one or more reality capturing devices 21 (e.g., which may have their own TOF sub-systems—not shown), and a display 11, all in wired and/or wireless communication with each other as well as with a computer network (not shown). The reality capturing devices 21 of the hub computing system 10 may operate in time multiplexed cooperation with the TOF sub-system 160 of the HMD 150. More specifically, the HMD TOF sub-system 160 may output a digitally-defined burst of scenery strobing first pulses during first time periods that are relatively short (e.g., 1/300th of a second per burst) followed by long stretches (e.g., 1/30th of a second per stretch) of no strobing. In an alternate embodiment, the environment strobing pulses are output as 4.5 millisecond long bursts. The reality capturing devices 21 of the hub computing system 10 may automatically determine when the non-strobing periods of the in-scene HMDs occur and may output their own strobing pulses during those times. The scenery strobing pulses of the respective devices 21 and 150 may be PWM coded and/or may occupy different portions of the electromagnetic spectrum.

The illustrated computing apparatus 12 may further be in wireless communication with an additional data processing device 5 (e.g., smartphone, touch tablet etc.) worn by the first user 18 where that worn data processing device 5 is in wired and/or wireless communication with the worn first HMD 150. In one embodiment, one or more of the users may further wear a so-called, smartwatch 29 which has its own data processing resources and is in wireless communication with one or more of the local user's additional data processing devices (e.g., with smartphone 5) and/or with the hub computing system 10. The worn data processing devices 5, 29 may contain respective low voltage portable power sources such as those comprising one or more rechargeable batteries (not shown, e.g., each having an output of about 5 VDC or less). In one embodiment, the HMD 150 may include a wireless or wired recharging means (not shown) by way of which its on-board battery (not shown) may be respectively recharged in a wireless or detachably wired recharging manner from one or more of ancillary devices, 5, 29 and 12.

Computing apparatus 12 may include one or more digital and/or analog signal processors as well as corresponding power supplies for powering those processors. Capture device 21 may include a combined color and depth sensing camera that may be used to visually monitor one or more targets including humans and one or more other objects within a particular environment 100. In one example, capture device 21 may comprise an RGB sensing array and an IR or near infrared (NIR) based depth sensing array and computing apparatus 12 may operate as a set-top box and/or as a real time gaming console. As indicated above, the capture device 21 may operate in time multiplexing and/or spectrum multiplexing cooperation with other in-room TOF determining sub-systems (e.g., 160). Additionally, the hub computing system 10 may be in cooperative wireless communication with multiple ones of head mounted displays (only one shown in detail as HMD 150) present in the local environment 100 and/or present in a remote environment (not shown).

As depicted in FIG. 1A, the first user 18 wears a respective first see-through head-mounted display denoted here as 150(1) and the second user 29 may wear his own see-through head-mounted display designated here as 150(2) although not explicitly referenced in the drawing. The worn see-through head-mounted displays, 150(1) and 150(2) may receive virtual image data from any of a number of processing devices as described herein, including hub computing system 10, smartphone 5 and/or smartwatch 29 such that a three-dimensional (3D) virtual object (e.g., monster 17) is perceived by each HMD wearing user to exist within a respective field of view as displayed through the respective HMD. For example, as seen by user 18 through his see-through head-mounted display 150(1), the virtual object 17 is displayed as pointing its backside toward first user 18. As seen by second user 19 through his see-through head-mounted display 150(2), the virtual object 17 is displayed as facing toward that second user 19 and standing closer to the second user 19 than the real chair 16.

Referring to the magnified depiction 160" of the embedded TOF sub-system 160 of the first HMD, in one embodiment, the TOF sub-system 160 is formed on a C-shaped multilayer printed circuit board (PCB) 161 that sports a combination RGB and IR/NIR camera 165 at its center and a plurality of high powered laser light emitters (e.g., IR and/or NIR laser diodes) such as 162a and 162b near the terminal ends of the legs of its C-shaped configuration. In one embodiment, the C-shaped printed circuit board (PCB) 161 has ten or more conductor layers spaced apart from one another by interposed dielectric layers. The positioning and/or angling of the respective laser light emitters (e.g., 162a, 162b) may provide for a wider pulse strobed illuminating (in the IR and/or NIR bands of the user's surrounding than might be possible or practical with just a single, center mounter laser light emitter (not shown). In one embodiment, there are at least four such laser light emitters on the PCB 161. The laser light emitters (e.g., 162a, 162b) may each comprise one or more high power laser diodes connected in various series and/or parallel electrical connection configurations. The laser light emitters may be packaged in connecter insertable packages (having contact terminals) or in solder mounted packages (having high amperage carrying solderable terminals). Depending on the characteristics of the on board laser light emitters, different drive voltages may be called for by way of which the laser light emitters are pulsed by high current levels and thus at corresponding high power levels. One or more on board, voltage boosting circuits (not shown, see 169" of FIG. 1B) may be provided for generating regulated voltages of respective values greater than that of the on-board portable battery or batteries; for example for powering the high power laser diodes. In one embodiment, the in HMD regulated voltage supplies include a 3.0 VDC supply, a 5.0 VDC supply and a 7.5 VDC supply. The current surge draws of the semiconductive light emitters may vary and may include those whose episodic current pulses are as large as about 10 to 20 Amperes each, but more typically around 1 A each. In one embodiment, a half length D0 of the illustrated C-shaped PCB 161 is about 2.1 inches and each extension leg thereof is about 1.0 inch long such that there is an electromagnetic signal propagation length of about 3 inches between the centrally disposed camera 165 and each of the terminally disposed laser light emitters, e.g., 162a, 162b. The terminally disposed laser light emitters 162a, 162b can be, but do not necessarily need to be of a same kind. They alternatively could have different optical output wavelength spectrums and/or they can point out from the forward major face of the PCB 161 at different 3D directed angles. For example in one embodiment, at least one of the terminally disposed laser light emitters is angled downward to illuminate the hands of the user for the purpose of detecting user hand gestures with the aid of 3D depth imaging. In one embodiment, the terminally disposed laser light emitters 162a, 162b are angled to provide a 120 degree wide strobed illumination of the user's field of view. Although just two such laser light emitters 162a, 162b are shown in FIG. 1A, other embodiments may comprise a greater number of light emitters having respective optical output power capabilities, respective optical output spectrums and/or respective axes of optical output distribution and room-sweep capability (e.g., more than 120 degrees laterally and/or vertically) and respective electric drive requirements. The optical output distributions need not be circular and instead could be multi-polar or otherwise configured.

Although not shown in FIG. 1A, metallic heat sinks may be provided at the backsides of the PCB 161 where the high powered laser light emitters 162a, 162b (e.g., IR/NIR laser diodes) are disposed so as to provide for cooling of the light emitters 162a, 162b after each respectively outputs a respective burst of light pulses. The heat sinks may be operatively coupled to air vents that are thermally isolated from the user's head. In one embodiment, the light emitters 162a, 162b alternate between each outputting a 3.33 millisecond (ms) burst of about 10,000 pulses (or in an alternate embodiment, outputting a 4 . . . 50 millisecond (ms) burst of about 26,000 pulses) and then being shut off for about 30 ms or longer. In one embodiment, each pulse has a pulse width in the range of about 5 ns to 23 ns, where the 3.33 ms long train of output optical pulses is followed by a no-output period (no-strobing period) of about 30 ms to thereby complete a 1/30th of a second frame period. A different one of the laser light emitters on the HMD may provide its output train of optical pulses in the next frame and so on, such that each on-HMD laser light emitter has a relatively long time to cool off after outputting its burst of high energy pulses. Other TOF sub-systems present within the environment 100 (e.g., those of capture devices 21) may output their own scenery strobing pulses during the no-strobe periods of the HMD-mounted light emitters (e.g., 162a, 162b). The no-output period of about 30 ms per frame may be used for data processing purposes and/or to refresh on-board voltage boosters including those that power the high power light emitters 162a, 162b with a voltage level greater than that of the on-HMD board battery or batteries (e.g., greater than 1.5 VDC, greater than 3.0 VDC or greater than 4.5 VDC).

Although thermal heat sinks and relatively long cooling off periods may be provided for the respective high powered light emitters (e.g., 162a, 162b) it is still possible through inadvertency in software control for the configuration of the pulse width modulated (PWM) drive signals of the high powered light emitters and/or of their direct driving switching elements (e.g., IGFETs) to be set such that these high powered components overheat and are themselves damaged and/or damage nearby other components. In particular, when a relatively small sized and components packed PCB 161 is used, heat sensitive other components may come to be laid-out relatively close to the high powered ones (e.g., light emitters) and thus may be affected by thermal output of the high powered components.

For sake of better understanding of possible constraints, one embodiment is described here wherein each 3.33 ms long train of high powered output optical pulses is subdivided into 0.022 ns long repeat intervals where the number of pulses in each repeat interval and the placements of the leading and trailing edges of those pulses in the repeat interval is flexibly digitally controlled by means of software, for example to a precision of around 50 picoseconds (85 picoseconds in one embodiment). For example it may be desirable to produce within the repeat interval, a predetermined number of pulses each having a substantially same peak magnitude, a peak plateau width of about 6 ns, a leading edge rise time of about 3 ns or less and a trailing edge fall time of about 10 ns or less. The specific waveform created by the programmably established pulses of the repeat interval and the phasing of the pulses in that interval may be heuristically varied to improve signal-to-noise performance and to minimize interference from undesired higher order harmonics. See for example U.S. Pat. No. 8,587,771 (issued Nov. 19, 2013) which explains how frequency content may affect signal to noise behavior. However, in heuristic varying of where each pulse goes and how wide each pulse, it may come to be that two or more medium width pulses are too close together and have the overheating effect of one excessively (undesirably) wide pulse or it may come to be that the software inadvertently commands the production of one excessively wide pulse that results in an undesirable overheating condition whereby the light emitter is damaged or suffers a permanent change to its operating characteristics and/or whereby a switching device (e.g., power MOSFET) that directly drives the light emitter is damaged or suffers a permanent change to its operating characteristics and/or whereby nearby other components are damaged or suffer permanent changes to their operating characteristics. Any of these outcomes is undesirable because, for example, they interfere with optimal operation of the TOF determining sub-system (e.g., 160) and/or with optimal operation of other nearby sub-systems; including for example by increasing power consumption, changing the I-V-T characteristics of important components and/or reducing accuracy.

In addition to the light emitter drivers, there is a second class of digitally controlled circuitry within the system. At substantially the same time as the software-defined pulse train is output from the then utilized light emitter (e.g., 162a), digital shutter control pulses are propagated to and applied to an IR and/or NIR sensor array of the camera 165 so as to digitally operate an integrated, electronic shutter mechanism of the camera 165 (e.g., a CCD based charge collection limiting mechanism). The shutter control pulses may drive a voltage bias terminal of the camera 165 and may thus control a light sensitivity and pulse discriminating attribute of the camera 165. More specifically, if the target real object (e.g., chair 16) is relatively close to the user and highly reflective, then the return trip light pulses will come back relatively strong and timed to be near the beginning of a sensing period that might additionally be filled with noise and artifacts. In such a case, the shutter is preferably operated at low sensitivity and is caused to be shut closed soon after the beginning of the sensing period so as to block out the noise and artifacts but to capture the leading and/or trailing edges of selected ones of the returned pulses of photons of the short TOF scenario. On the other hand, if the target real object (e.g., second user 19) is relatively far from the first user 18 and poorly reflective, the return trip light pulses will come back relatively weak and timed to be near the end of the return light sensing period. In that case, the camera shutter may be operated at high sensitivity and as shut closed at the beginning of the sensing period while open near the end and then closed shut again. In other words, the shutter mechanism may be variably and digitally operated under control of software to compensate for the different return light possibilities, for example by being open for only a short period of time near the front end of the return light sensing period and by being open for a longer time near the tail end of the return light sensing period so as to avoid oversaturation from too bright of return light from nearby reflective objects and so as to avoid too low of a sensitivity for weak return light from far away and less reflective target objects.

The timings and magnitudes of the electronic shutter pulses as applied to the centrally mounted camera 165a and the timings of the electronic light emission drive pulses as applied to the terminally disposed light emitters 162a, 162b need to be synchronized to be very close chronologically to one another (e.g., within about 50 ps of one another in one embodiment; within about 85 ps of one another in another embodiment). In one embodiment, a digital reference clock generator (see 163b" of FIG. 1B) is provided in a PCB circuit section 163b located about midway between the camera 165 and a first (e.g., 162b) of the light emitters. A first electromagnetic signal propagation time delay is experienced by electrical signals traveling from PCB circuit section 163b to a more terminal PCB circuit section 163a near the first (e.g., 162b) light emitter. A second electromagnetic signal propagation time delay is experienced by electrical signals traveling from PCB circuit section 163b to a more central PCB circuit section 163c near the camera 165. The first and second electromagnetic signal propagation time delays may vary as functions of temperature, fabrication process (including change to device physics due to post manufacture overheating), voltage and/or other system parameters. One or more variable time delay elements are provided on the PCB 161 to compensate for these variation effects and to assure that the camera 165 receives its shutter control pulses (not shown in FIG. 1A, see instead 123a", 123b" of FIG. 1B) at substantially the same time (e.g., on a 50 ps resolution level) as the light emitter (e.g., 162b) receives its waveform of laser drive pulses (not shown in FIG. 1A, see instead 121" of FIG. 1B). FIG. 1A additionally shows that other PCB circuit sections such as 164a may be interposed between the centrally mounted camera 165 and light emitters (e.g., 162a) disposed at the other terminal end of the printed circuit board (PCB) 161. As mentioned, there can be more than two laser light emitters and they may be disposed elsewhere on the PCB 161. A respective different time delay may be needed for each of the differently disposed light emitters.

While not detailed in FIG. 1A, it is to be understood that the circuitry of PCB 161 may be in operative wired and/or wireless communication with other parts of the head-mounted display (HMD) 150 including for example with regulated power supplies (e.g., 3.0 VDC, 5.0 VDC) disposed elsewhere in the HMD, with a serial and/or parallel communication port disposed elsewhere in the HMD, with digital processors and/or other control circuitry 136 disposed elsewhere in the HMD. Alternatively or additionally, an electrical cable may be detachably operatively coupled to a worn further module such as smartphone 5 where the latter serves as a battery-powered low voltage power recharging supply for the HMD and as a temporary communication mechanism for coupling to the computing hub 10 and/or directly to the internet or another form of network. Wireless communication as between the head mounted display device (HMD) and the computing hub 10 and/or directly to with internet or with another form of network is also contemplated. In one embodiment, and because it provides currents of relatively large magnitudes (e.g., an average DC flow of about 0.5 A when activated to be in a current regulating mode), so-called, voltage booster modules (e.g., 169" of next described, FIG. 1B) are mounted on the PCB 161 in relatively close proximity to corresponding high powered components (e.g., 163a" and 162b" of FIG. 1B) so as to minimize $I^2R$ losses due to PCB trace resistances.

Figure 1B:
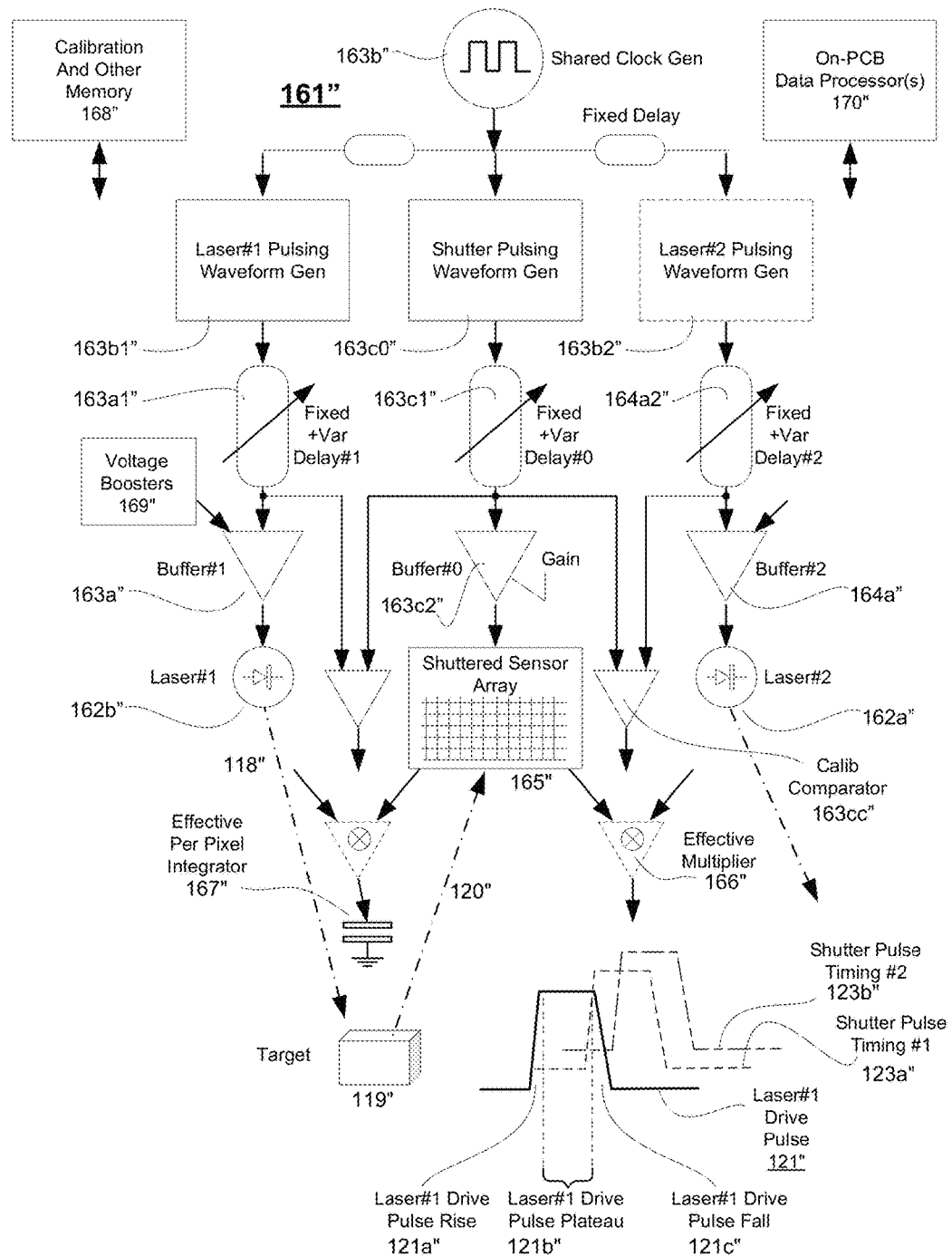
FIG. 1B is a schematic diagram organized to show a signal propagation race through physical space between signals used to drive the light emitters of FIG. 1A and signals used to gate light sensors of FIG. 1A.

Referring next to FIG. 1B, provided here is a schematic diagram organized to show how various electrical signals may propagate about the physical layout of a printed circuit board (PCB) 161" similar to that 161 of FIG. 1A. Not all of the elements shown in FIG. 1B are necessarily provided on the PCB 161 of FIG. 1A. Some of the structure of FIG. 1B is shown for sake of symmetry and easier understanding. This will be made clearer as the details of FIG. 1B are described below. The purpose of FIG. 1B is to show the correspondence between physical layout, component function, delays encountered by signals used to drive the light emitters (e.g., 162a", 162b"), delays encountered by the signals used to gate the light sensors (e.g., IR sensitive pixels) of the camera sensor array 165" mounted at its respective position on the PCB 161" and the variable delays that may be used to bring shutter and light emitter drive signals into very close temporal alignment with one another (e.g., within about 50 ps of one another).

A reference clock generator 163b" is preferably disposed physically close to the camera array 165", for example in PCB area 163b of FIG. 1A. Immediately adjacent to the reference clock generator 163b", for example in PCB area 163c of FIG. 1A, there is provided a shutter pulsing waveform generator 163c0". In one embodiment, the shutter pulsing waveform generator 163c0" is a digitally controlled one and also serves as a laser pulsing waveform generator, thus obviating the need for blocks 163b1" and 163b2" where the latter are in that case replaced by short circuiting PCB traces. This explains part of what was meant above by not all of the elements shown in FIG. 1B being necessarily also provided on the PCB 161 of FIG. 1A. Alternatively, the shutter pulsing waveforms output by waveform generator 163c0" are custom tailored to how it is desired to drive a sensitivity shuttering aspect of the shuttered sensor array 165" (e.g., a CCD array) and in that case, one or both of the further illustrated, laser pulsing waveform generators, 163b1" and 163b2" are provided for separately defining the train of pulses that respectively drive laser light sources 162b" and 162a". In one embodiment, the laser number 1 (#1) pulsing waveform generator 163b1" is physically disposed in PCB area 163b of FIG. 1A and immediately adjacent to the shared reference clock generator 163b". In one embodiment, the Laser#1 pulsing waveform generator 163b1" is digitally programmable, includes a tapped delay line with 85 picoseconds apart delay elements (or other small delay lengths, for example having 50 ps delay elements) and a digitally controlled multiplexer and thereby allows for the generating of customized pulses including those having a rising edge duration of about 1 ns or less, a level plateau width of about 5 ns or more and a falling edge duration of about 1 ns or less. These may be used to drive a high voltage/high current light source driving buffer 163a". Due to parasitic capacitances present within the high voltage/current light source driving buffer 163a", the actual rise and fall times of electrical signals driven through the laser light source 162b" may be larger. More specifically, the falling edge duration of the electrical signals driven through the laser light source 162b" may be undesirably long, for example, longer than 10 ns. Such prolonged leading and/or trailing pulse edges may undesirably contribute to overheating of components. However, the main culprit leading to overheating is the case where individual pulses in the train are each made excessively long (e.g., greater than 50 ns) and/or the off time between immediately adjacent pulses is made too short (e.g., less than 20 ns).

Propagation speeds of electrical signals through conductors and semiconductors tend to be substantially smaller than propagation speeds of photonic signals (e.g., 118" and 120") through air. This itself is not a problem. However, in order to properly generate the outgoing photonic signals (e.g., 118") and properly process the return photonic signals (e.g., 120") it is desirable that steep rising and falling edges be provided in the buffered output signals of buffer 163a" (e.g., in laser driving pulse 121") and in the buffered output signals of the shutter operating buffer 163c2" (e.g., in shutter driving pulses 123a" and 123b"). It is also desirable that the relative timing relations between these preferably steep rising and falling edges be controlled to a high level of resolution in spite of variations in system operating temperatures, variations in system fabrication processes (including changes to operating characteristics due to overheating effects) and circuitry layout choices.

To this end, at least one digitally controllable time delay element is provided as having a fine delay resolution (e.g., 50 ps or 85 ps per discrete delay amount) and as interposed between either the Laser#1 pulsing waveform generator 163b1" and its corresponding high power Buffer#1 163a" or between the Shutter pulsing waveform generator 163c0" and its corresponding Buffer#0 163c2" or between the Laser#2 pulsing waveform generator 163b2" and its corresponding high power Buffer#2 164a". For sake of generality, all three of such interposed and digitally controllable time delay elements, 163a1", 163c1" and 164a2" are respectively shown in FIG. 1B. It is to be understood that in addition to having the optionally interposed, digitally controllable time delay elements, there will be some relatively fixed time delaying elements (e.g., PCB traces) in the respective signal propagating paths between the Laser#1 pulsing waveform generator 163b1" and its corresponding high power Buffer#1 163a"; between the Shutter pulsing waveform generator 163c0" and its corresponding Buffer#0 163c2"; and between the Laser#2 pulsing waveform generator 163b2" and its corresponding high power Buffer#2 164a". The fixed delays may vary as functions of temperature, variations in system fabrication processes and circuitry layout choices. One or more calibration processes adjust the at least one included of digitally controllable time delay elements, 163a1", 163c1" and 164a2" to compensate for those variations as well as for non-linearities in control functions. The specifics of such calibration processes are outside the scope of the present disclosure. In one embodiment, one or more calibration comparators (e.g., 163cc") are provided on the PCB 161" and each connected for receiving the leading and falling edges of the shutter driving pulses (as input into Buffer#0 163c2") and for receiving the leading and falling edges of at least one of the light emitter pulsing trains (as input into Buffer#1 163a" or into Buffer#2 164a") and for determining when; due to adjustment of the digitally controllable time delay element(s), (at least one of 163a1", 163c1" and 164a2") the received edges are time wise crossing relative to one another. Thereafter, a desired timing relationship between the shutter driving pulses (as input into Buffer#0 163c2") and the light emitter pulsing trains (as input into Buffer#1 163a" or into Buffer#2 164a") may be digitally commanded with use of on or off-board digital controllers and/or data processors 170" and on or off-board calibration parameter storing memories 168" and on or off-board control software stored in on or off-board instruction storing memories such as for example 168".

The one or more calibration comparators (e.g., 163cc") of the one embodiment do not, however, detect the timing relations of signals within or output by the shutter driving Buffer#0 163c2" and the light source, direct driving Buffer#1 163a" and Buffer#2 164a". This is so because the calibration comparators (e.g., 163cc") operate with low voltage, logic level signals whereas, at least the light source direct driving Buffer#1 163a" and Buffer#2 164a" operate with relatively higher voltages and/or currents. In light of this, if a design change is to be made to the light source direct driving Buffer#1 163a" and Buffer#2 164a", that design change should not introduce a significant time delay to signals propagating through the light source direct driving buffer (e.g., 163a" and 164a") and that design change should not introduce a significant uncertainty as to the timing relationship between rising and falling edges of pulsed signals propagating through the light source direct driving buffer (e.g., 163a" and 164a").

Additionally, for the sake of assuring sufficiently fast rise and fall times for the pulses that drive various components having relatively large capacitances, it may be desirable in certain parts of the system to provided relatively high voltages (e.g., on the order of 7 VD to 12 VDC) for driving RLC circuitry toward desired peak states in relatively short time (e.g., within 10 ns).

Design changes that allow for realization of the above are disclosed herein. However, before those changes are described in detail, the remainder of FIG. 1B is described for sake of completeness.

The combined effect of the pulsed laser light (e.g., 118") and of the pulsed shuttering of the light sensitive sensor array 165" can be made equivalent to that of effectively multiplying (166") the magnitudes of the overlapping concurrent portions of the respective waveforms of the outgoing and shuttered return light. More specifically, FIG. 1B shows a leading edge portion of a first shutter driving pulse 123a" time-wise overlapping a falling edge portion 121c" of a direct laser driving pulse 121" where the assumption is that the sensed return light 120" corresponds to the magnitude of the illustrated direct laser driving pulse 121". The magnitude of the first shutter driving pulse 123a" can be controlled by a digital Gain control terminal of the shutter driving Buffer#0 163c2" so as to accommodate different magnitudes of sensed return light 120". If the first shutter driving pulse 123a" is at zero or the direct laser driving pulse 121" is at zero, the result of the effective multiplying of the two is zero. On the other hand, when both are non-zero the multiplication result is integrated and stored in an effective and per-pixel storage means 167" (which can be the CCD wise interconnected light sensing pixels of the array 165"). Time of Flight (TOF) can be determined by sampling many times to improve the signal to noise ratio. The statistical contours of the trailing edges (corresponding to edges 121c") of the returned light pulses can be explored by time-wise shifting the leading edges of the shutter driving pulses, for example by modulating between the phases of the first illustrated shutter pulse 123a" and that of the second illustrated shutter pulse 123b". Conversely, the statistical contours of the leading edges (corresponding to edges 121a") of the returned light pulses can be explored by time-wise shifting trailing edges of the shutter pulses when those time-wise overlap with the leading edges of the returned light pulses. Resolution for Time of Flight (TOF) determination can be improved by causing the leading and falling edges of the direct laser driving pulses 121" and of the direct shutter pulsing signals 123" to be as steep as practical.

Block 169" of FIG. 1B represents a plurality of voltage boosters that can increase a supplied DC power voltage from say a battery input of between 3 VDC-5 VDC to regulated voltage such as 5.0 VDC and 7.5 VDC so as to meet voltage drive requirements of certain components and so as to increase the drive power applied to the driven light sources (e.g., IR laser diodes 162a" and 162b") for providing appropriate output luminances. Item 119" is laser target whose distance from the TOF sub-system is to be determined. It could be as far away as 15 feet, 30 feet or further. In one variation, the respective, digitally adjustable delays of delay elements 163a1", 163c1" and 164a2" are instead integrated into their preceding waveform generators 163b1", 163c0" and/or 163b2" for example by changing the timing along a tapped delay line (part of a DDL not shown, see instead 201 of FIG. 2B) where the leading edge of the first pulse in a repeated train of such pulses appears.

Referring to FIG. 2A, an example of a laser light source driver 201 is now described. A train of substantially rectangular pulses is generated by a digitally controlled, multi-tapped digital delay line (DDL) 201 having a positive feedback element (e.g., amplifying buffer A0) and operating for example with 3V binary signals. The DDL 201 is digitally programmable (and controlled by an on-board memory and/or microcontroller, e.g., 168", 170" of FIG. 1B) such that chronological spacing between each of the pulses (only one shown at 221) in a repeat interval is customizable and such that chronological placement of a leading edge portion 221a of each such pulse 221 is customizable; chronological placement of a trailing edge (e.g., falling edge) portion 221c of each such pulse 221 is customizable and thus width of a peak plateau portion 221b of each such pulse 221 is customizable. Accordingly, and as mentioned above, software instructed varying of where each pulse places on the time line, and how wide each pulse is, may result in production of two or more medium width pulses that are too close together and thus have an overheating effect similar to that of one excessively wide pulse or software instructed varying may result in an inadvertent production of one excessively wide pulse that leads to an undesirable overheating condition whereby the light emitter is damaged or suffers a permanent change to its operating characteristics and/or whereby a switching device (e.g., power MOSFET) that directly drives the light emitter is damaged or suffers a permanent change to its operating characteristics (I-V-T characteristics) and/or whereby nearby other components are damaged or suffer permanent changes to their operating characteristics. Any of these outcomes is undesirable because, for example, they can interfere with optimal operation of the TOF determining sub-system (e.g., 160) and/or with optimal operation of other nearby sub-systems; including for example by increasing power consumption and/or reducing accuracy.

In one embodiment, the leading edge portion 221a of the DLL generated pulse has a rise time of less than 1 ns and the trailing edge 221c has a fall time of about 1 ns or less. The width of the peak plateau portion 221b is controllable in increments as small as about 50 picoseconds to about 85 picoseconds. Thus precise and digitally controlled fine tuning of edge placement is possible. It is within the contemplation of the present disclosure to use other programmable pulse train generators with similar capabilities for coarse and fine chronological placement of pulses and of their respective leading and trailing edges where the edges have such relatively steep rise and fall geometries. The magnifying glass in FIG. 2A points to node N2 and shows in magnification one of 5.0V peak pulses appearing at node N2 as a result of a level shifting function provided by non-inverting amplifier A1.

In one embodiment, an additional software controlled block 202 may be included that determines the amount of luminance to be output by the semiconductive light emitters (e.g., Laser#1). In one variation, the software controlled block 202 is operatively coupled to a voltage boosting module 207 for controlling a voltage output by the voltage boosting module 207 or for controlling other operating characteristics of the voltage boosting module 207. (For the case of below described, FIG. 2B one of those other operating characteristics of the respective voltage boosting module 207' is a target DC output current level of the respective voltage boosting module 207' when the latter is in a current regulating mode.)

The illustrated laser light source driver 201 of FIG. 2A further comprises a plurality of bipolar junction transistors (BJT's), Qp3, Qn4 connected in an emitter follower configuration and a power MOSFET Qn7. BJT Qn4 is an NPN transistor while Qp3 is a PNP transistor. The power MOSFET Qn7 is an N-channel device. In one embodiment, all of Qp3, Qn4 and Qn7 are silicon based discrete devices having miniaturized solder bump mount packages with package dimensions on the order of about 1 mm. Thus they consume relatively little space on the PCB 160 (FIG. 1A). It is within the contemplation of the present disclosure to use other semiconductive material technologies for one or more of Qp3, Qn4 and Qn7 such as, but not limited to, III-V compounds such as GaAs and/or nitrides thereof (e.g., GaN), strained lattice SiGe formulations and so forth.

Buffering amplifier A1 connects to a 5V power supply and it level shifts the 3V pulses output by the DDL circuit 201 into 5V pulses. (In an alternate embodiment, the pulses are 4.5V high due to internal voltage drops in amplifier A1.) Complimentary bipolar junction transistors (BJT's), Qp3 and Qn4 form an emitter follower type of driver for the parasitic gate capacitance $C_p$ of the power MOSFET Qn7. The level shifted pulses 221 of the pulse train that is applied to the base terminals of Qp3 and Qn4 has a peak plateau magnitude of about 5 volts. This value is picked to sufficiently drive MOSFET Qn7 into saturation and to compensate for band gap characteristics of the silicon based BJT's, Qp3 and Qn4 of the exemplary embodiment 210. While the base drive voltage at node N2 is 0V before the leading edge of the pulse 221 arrives, if node N3 is above threshold (e.g., 0.6V) Qp3 becomes forward biased and drains the gate capacitance Cp of charge so as to drive the voltage of gate node G7 to below the threshold voltage ($V_{THigfet}$) of the MOSFET Qn7. Thus Qn7 is substantially turned off.

When the leading edge portion 221a of the applied pulse 221 arrives and crosses above around 0.6V, NPN transistor Qn4 is rapidly turned on and is provided with adequate current from the relatively high voltage V7 of the Vboost circuit 207 to charge up the voltage of gate node G7 to the voltage of the applied pulse 221 (e.g., 5.0V) minus the base-emitter forward drop Vbe4Fwd of Qn4. This voltage is above the threshold voltage ($V_{THigfet}$) of the MOSFET Qn7 and thus Qn7 is rapidly turned on. At the same time, because the voltage on node G7 rises to about 5V and current $i_{gs1}$ into the gate capacitance $C_p$ is diminishing as gate capacitance $C_p$ charges up, the forward bias current from node N2 into the emitter of Qn4 self-extinguishes and Qn4 turns off. Thus power consumption for turning on MOSFET Qn7 is limited to that needed to charge up the voltage of gate node G7 to above the threshold voltage ($V_{THigfet}$) of the MOSFET Qn7.

When the trailing edge 221c of the applied pulse 221 arrives and crosses below the voltage on G7 minus around 0.6V, PNP transistor Qp3 turns on and, as an emitter follower, starts draining gate capacitance Cp of charge so as to drive the voltage of gate node G7 below the threshold voltage ($V_{THigfet}$) of the MOSFET Qn7. Thus Qn7 is substantially turned off.

As mentioned, the collector of NPN transistor Qn4 is connected to a relatively high voltage rail (node V7) which in one embodiment, is generally maintained at about 7.5V by action of a voltage boosting circuit 207. Voltage boosting circuit 207 receives a power input from a lower voltage source, for example an on board regulated 5 VDC source (not shown). As soon as Qn4 becomes forward biased in response to the leading edge 221a of pulse 221, it couples the V7 rail voltage (e.g., 7.5V minus the forward emitter-collector drop, Vec4 of Qn4) to charge the gate capacitance Cp (with current $i_{gs1}$). Voltage at the base B3 of PNP transistor Qp3 rises at least as fast if not faster than voltage at its emitter (node N3) and thus Qp3 is kept reverse biased and turned off. In short, the charging up of the MOSFET gate (G7) at substantially a same time (e.g., simultaneously) turns Qn4 first on and then off while Qp3 is kept turned of. When MOSFET Qn7 turns on, a large surge of current flows through light emitting element (e.g., IR laser diode or series of diodes) interposed between the drain terminal D7 of the MOSFET and the V7 node. In one embodiment, the surge has a magnitude of about 0.5 amperes but it could be higher or lower. In another class of embodiments, the current surges can be as high as 10 to 20 Amperes. Although for the sake of reduced clutter it is not shown in FIG. 2A (and in 2B), a relatively large charge storage capacitor is connected to nodes V7 and S7 and positioned in relatively close physical proximity to the series combination of Qn7 and its load (e.g., Laser#1) so that large current surges (e.g., 0.5 A-20 A) can be drawn directly from the capacitor. The adjacent power supply 207 (or 207' of FIG. 2B) thereafter supplies replenishing charge to the capacitor. The drawn current surges should have relatively short durations corresponding to the pulse widths of the drive control pulses 221, for example on the order of about 50 ns or less (more specifically, about 6 ns in one embodiment). However, it is possible for the digitally controlled DDL circuit 201 to be programmably commanded to output longer pulse widths or very short durations of off time and then the high powered components (e.g., Qn7, Laser#1) may overheat and become damaged by such overheating (e.g., experience a change of I-V-T characteristics).

FIG. 2B illustrates a self-synchronizing and low part count modification that overcomes or reduces the problem of potential overheating in the form of modified light emitter driver 220. As seen, a few extra components, namely, NPN transistor Qn1, resistor R2 and capacitor C1 are inserted in a manner where, if the NPN transistor Qn1 (e.g., a silicon bipolar junction transistor) is switched on, a relatively large first current, $i_{GTTh1}$ is pulled out of level shifting amplifier A1 to support a corresponding current flow $i_{GTTh2}$ moving through the triggered on, NPN transistor Qn1. The level shifting amplifier A1 is designed however, such that its output drops substantially below 5V when attempting to supply the relatively large first current, $i_{GTTh1}$. On the other hand, the level shifting amplifier A1 is designed to provide an output relatively close to 5V when supplying a substantially smaller current $i_{LTTh0}$ merely for forward biasing the base-emitter junction of NPN transistor Qn4. Accordingly, if transistor Qn1 is not triggered into a high current mode, the amplifier A1 is able to supply about 5V to the base of transistor Qn4. On the other hand, if transistor Qn1 is triggered into a high current mode (one where $i_{GTTh1}$ flows), the amplifier A1 is not able to supply the approximately 5V level, the base-emitter junction of Qn4 becomes reverse biased and Qn4 shuts off. At the same time, PNP transistor Qp3 can become turned on so as to discharge the gate capacitance $C_p$ of the power MOSFET Qn7 and to thus turn off the latter power component.

A magnified exemplary embodiment of amplifier A1 is depicted in FIG. 2B. The exemplary amplifier A1 is composed of an even number of inverters such as the illustrated A1.1 and A1.2. The first inverter, A1.1 is a CMOS inverter powered by the on-board 3 volt power supply (V3). The second inverter, A1.2 is a CMOS inverter powered by the on-board 5 volt power supply (V5) and comprised of an NMOS transistor Qno in cascade connection with a PMOS transistor Qp0. The source of Qp0 connects to the V5 power rail. The drain of Qp0 connects to the drain of Qn0 and to node N2. The source of Qn0 connects to ground. The PMOS transistor Qp0 is sized such that when the output of first inverter A1.1 is low (e.g., at 0V) and Qn1 is below its trigger threshold, PMOS transistor Qp0 can output a forward biasing current $i_{LTTh0}$ for forward biasing the base-emitter junction of NPN transistor Qn4 with relatively small voltage drop (e.g., $V_{dsP0}$<0.5V) between the source (V5) and drain (N2) of Qp0. Additionally, the PMOS transistor Qp0 is sized relative to NPN transistor Qn1 such that if Qn1 is triggered into its high current mode, a relatively large voltage drop (e.g., $V_{dsP0}$>2.5V) appears between the source (V5) and drain (N2) of Qp0 when the output of first inverter A1.1 is low (e.g., at 0V), this occurring because the PMOS transistor Qp0 has insufficient current conducting capability (e.g., too small of a channel width) to output the relatively large first current, $i_{GTTh1}$ drawn by NPN transistor Qn1 when Qn1 is triggered into its high current mode. This set of conditions forces the NPN transistor Qn4 to shut off and stop applying approximately 5V to node N3. This in turn causes the power MOSFET Qn7 to turn off or at least switch into a reduced current mode because its gate-to-source voltage (at node G7) is below its saturated operation level. As a consequence, current flow $i_{ds7}$ through the high powered components (e.g., Qn7, Laser#1) decreases and overheating is prevented.

Resistor R2 and capacitor C1 form an analog voltage integrating circuit. While the voltage at node N1 is high (e.g., 3.0V), current flows through resistor R2 to charge up capacitor C1. On the other hand, while the voltage at node N1 is low (e.g., 0V), a discharge current flows through resistor R2 to discharge capacitor C1. Some amount of discharge current can also flow out of capacitor C1 and through the base-to-emitter path of the voltage triggered, transconducting device (Qn1) although this amount can be relatively negligible when VN4 is below threshold. The durations of the charge and discharge modes, as well as the RC time constant provided by the selected values of resistor R2 and capacitor C1 will determine what voltage VN4 develops across capacitor C1. As long as the voltage VN4 across integrator capacitor C1 stays below the predetermined threshold voltage (e.g., 0.6V) of the voltage triggered, transconducting device (Qn1), the transconducting device draws only a negligible amount of current and does not interfere with the operation of the rest of the MOSFET drive circuit 220. However, when the voltage across integrator capacitor C1 reaches or exceeds the predetermined threshold voltage (e.g., 0.6V) of the voltage triggered, transconducting device (Qn1), the transconducting device switches into a relatively high transconductance mode (e.g., a $\Delta i/\Delta v$ ratio greater than 10 or better yet greater than 50); conducts a relatively large current $I_{GTTh2}$ (where here GTTh stands for greater than threshold) and thereby interferes with the operation of the rest of the MOSFET drive circuit 220. More specifically, it cause the power MOSFET Qn7 to become turned off and thus prevents large currents (ids7 of FIG. 2A) from flowing through the high powered components (e.g., Qn7 and Laser#1).

The added, pulse width limiting components, namely, NPN transistor Qn1, resistor R2 and capacitor C1 can be in the form of miniaturized solder bump mount packages with package dimensions on the order of about 1 mm or less. Thus they consume relatively little space on the PCB 161 (FIG. 1A) and do not substantially change signal propagation delay through the laser's direct drive buffer circuit 220. The values of resistor R2 and capacitor C1 may be heuristically selected in view of the peak voltages (e.g., 3V) of the pulses output by the DDL 201 and the trigger threshold voltage (e.g., 0.6V) of the voltage triggered, transconducting device (e.g., Qn1) and the maximum pulse width modulation ratio (duration of high levels over duration of low levels plus high levels) to be allowed for the pulses output by DDL 201 over a predetermined time period (e.g., 100 ns or less). In one embodiment, the pulse width clamping circuit cuts off any one single pulse having a pulse width greater than 75 ns. The trigger threshold voltage (e.g., 0.6V) of the voltage triggered, transconducting device (e.g., Qn1) should be less than the peak voltage (e.g., 3V) of the pulses applied to the input (node N1) of the integrator.

FIG. 2B shows a further addition of an inductor RL55 that has a characteristic inductance L5 and an inherent resistance R5. For example inductor RL55 may be of a wire-wound air core type configured for operating at frequencies of about 45 MHz and higher. Inductor RL55 is inserted so as to form an RLC loop when considered in combination with gate capacitance Cp of MOSFET Qn7. In one embodiment, the added inductor RL55 is also in the form of a miniaturized solder bump mount package with package dimensions on the order of about 1 mm or less. Thus it consumes relatively little space on the PCB 161 (FIG. 1A) and does not substantially change signal propagation delay through the laser's direct drive buffer circuit 220. In the illustrated embodiment, one terminal of the dual terminal inductor RL55 connects directly to ground (e.g., a wide area ground plane among the plural conductive layers of the PCB 161) while the other terminal connects to node N5. The inductance L5 of the inductor RL55 is used to provide faster discharge of the high gate capacitance Cp of the power MOSFET Qn7. Details of that operation are not wholly germane here. Very briefly, when Qn7 is being turned on, a first current $i_{La}$ flows downward through the inductance L5 and its characteristic resistance R5. When Qn7 is being turned off, a magnetic filed of L5 collapses and an induced second current $i_{Lb}$ flows downward through the inductor RL55 to more quickly discharge gate capacitance Cp.

Figure 3A:
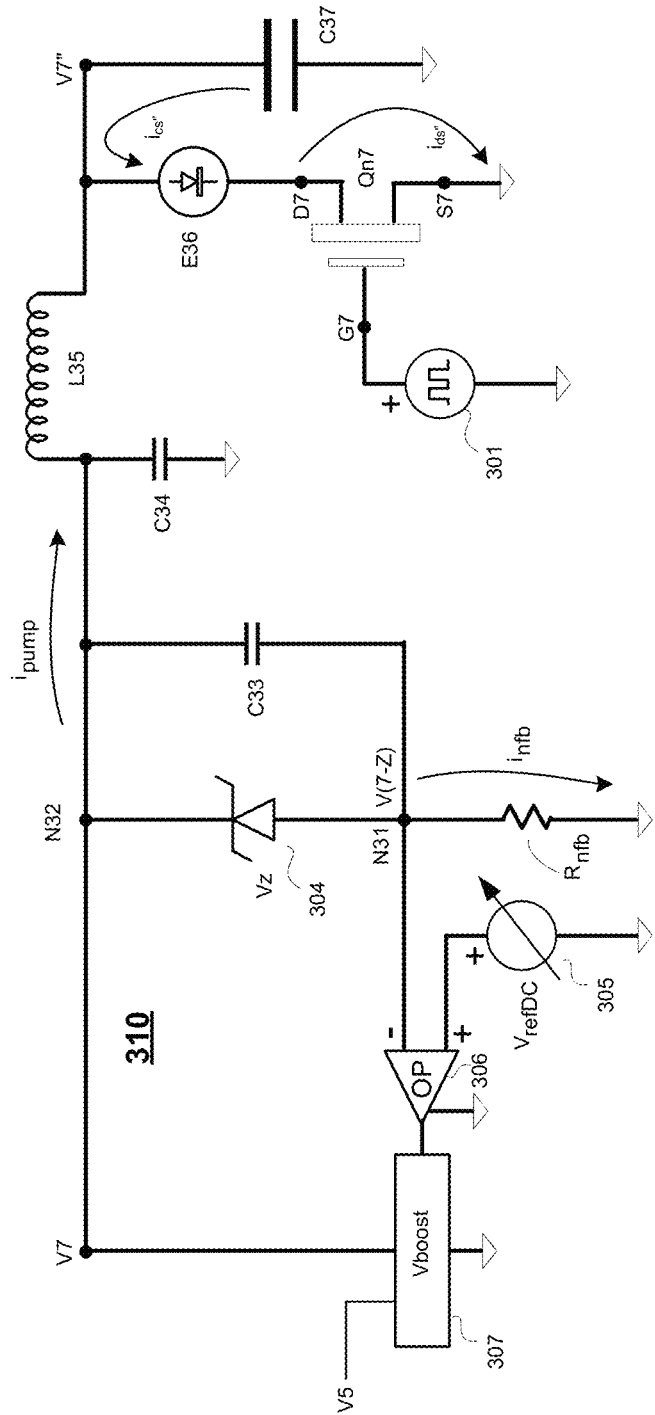
FIG. 3A is a schematic diagram of a first circuit that includes a voltage regulated power supply.

Referring to FIG. 3A, shown is a first circuit 310 including a voltage regulated power supply comprised of a feedback controlled voltage boosting module 307. The voltage boosting module 307 receives input power from a regulated other power supply, for example in this case from an on-board 5.0 VDC supply (V5). A high gain operational amplifier 306 drives a control terminal of the voltage boosting module 307. When the output of the operational amplifier 306 is positive (logic high), the voltage boosting module 307 responsively increases a DC voltage V7 present at an output terminal thereof by pumping charge (e.g., in the form of pump current $i_{Pump}$) which pumped charge accumulates in capacitors C34 and C37 during time periods that power MOSFET Qn7 is not being fired (turned on by pulse train source 301). The control of the voltage boosting module 307 may be digital or analog. If digital, then the voltage boosting module 307 has only two modes: on (and pumping out a fixed amount of boosting current $i_{Pump}$) or off (and not pumping out any boosting current). On the other hand, if the control of the voltage boosting module 307 is analog, than the level of pumped out boosting current $i_{Pump}$ may vary as a linear or other function of the output voltage of the Op amp 306. In one embodiment, the output DC voltage V7 is designed to nominally be at about 7.0 VDC where this value is predetermined to be a desired drive voltage to be placed across the load E36 when at a nominal operating temperature (e.g., slightly higher than room temperature). In one embodiment, the output DC current, $i_{Pump}$ output by the voltage boosting module 307 is about 0.5 A DC maximum. It is within the contemplation of the present disclosure to use other values (e.g., higher nominal voltage and/or higher maximum current levels).

When the output of the operational amplifier 306 is zero (logic low) or driving negative, the voltage boosting module 307 responsively stops increasing the DC voltage V7 output at its corresponding output terminal, and if the boosting is allowed to cease for sufficiently long time, the output voltage drops to a lower value, for example less than 7.0 VDC due to leakage currents. It is to be understood that the actions of the voltage boosting module 307 (which in one embodiment includes an oscillator and a charge pump—not shown) are relatively slow as compared to the power needs of the fast pulsed light emitter E36. When pulses are commanded (e.g., by signal source 301), the immediately needed power is drawn from the immediately adjacent and relatively large charge storage capacitor C37. Charge storage capacitor C37 is configured such that its corresponding RLC loop (where the R is the resistance of Qn7 and E36) has a relatively small loop inductance. While short bursts of surge current are drawn from storage capacitor C37, a steady flow of replenishing current, $i_{Pump}$ flows into C37 as substantially DC current passing through RF choke coil L35 and past RF suppressing capacitor C34.

The positive input terminal (+) of the high gain operational amplifier 306 (Op amp 306) is connected to a DC reference voltage source 305. In one embodiment, the corresponding reference voltage, $V_{refDC}$ is fixed at 0.5 VDC. In an alternate embodiment, the corresponding reference voltage, $V_{refDC}$ is digitally controllable and may be set to another temperature-independent value, for example in digitally controllable increments of 0.1 volts in a range of 0 VDC to 5.0 VDC.

The negative input terminal (−) of the high gain operational amplifier 306 is connected to a voltage drop providing element 304, in this case a Zener diode having a nominal drop of Vz volts, where in one embodiment the nominal drop Vz is picked to be 6.5 volts. An appropriate biasing resistor $R_{nfb}$ (where here "nfb" stands for negative feedback) is provided so as to keep the Zener diode 304 in the Zener breakdown portion of its I-V behavior curve. If the voltage at node N32 is at the desired 7.0 volts target value, a corresponding Zener-controlled current, $i_{nfb}$ flows through the voltage drop providing element 304 and through the negative feedback resistor $R_{nfb}$ such that the predetermined 6.5 volt drop develops across element 304. In that case, node N31 is at exactly 0.5V matching the 0.5 VDC reference output of DC reference voltage source 305 (for the case where $V_{refDC}$ is fixed at 0.5 VDC). In response, the high gain operational amplifier 306 outputs zero volts (a logic low) and the voltage boosting module 307 stops pumping charge out to node V7, thereby leaving that node at its present nominal voltage level, which is 7.0V.

If the voltage at node V7 (which connects directly to node N32) drops below the desired 7.0V nominal level, the voltage at feedback node N31 correspondingly drops below $V_{refDC}$ (e.g., 0.5 VDC) and the high gain operational amplifier 306 is activated to output a positive drive voltage (e.g., a logic high) to the voltage boosting module 307. The boosting module 307 then responsively starts pumping charge ($i_{pump}$) out to its output node V7 until the target 7.0V level is reached and then it stops. If for some reason, node V7 is above the target 7.0V level, the boosting module 307 does nothing. Over the long haul, leakage current flows through the Zener diode 304 and the negative feedback resistor $R_{nfb}$ so that charge is depleted from node V7. Alternatively or additionally, the pulse train source 310 is eventually activated, it turns on MOSFET Qn7 and the latter device discharges current by way of light emitter E36 and RF choke L35. One function of the RF choke L35 and of a high frequency suppressing capacitor C34 attached thereto is to block high frequency noise from leaking back to the high gain operational amplifier 306 when the pulse train source 310 is outputting a train of high frequency pulses (221 of FIG. 2A). Capacitor C33 stabilizes the negative feedback loop of the high gain operational amplifier 306. When the voltage at feedback node N31 drops below $V_{refDC}$ the OP amp 306 switches to outputting a logic high and the Vboost module 307 again pumps charge out to node V7 until the desired voltage equalization between node N31 and $V_{refDC}$ is achieved.

Figure 3B:
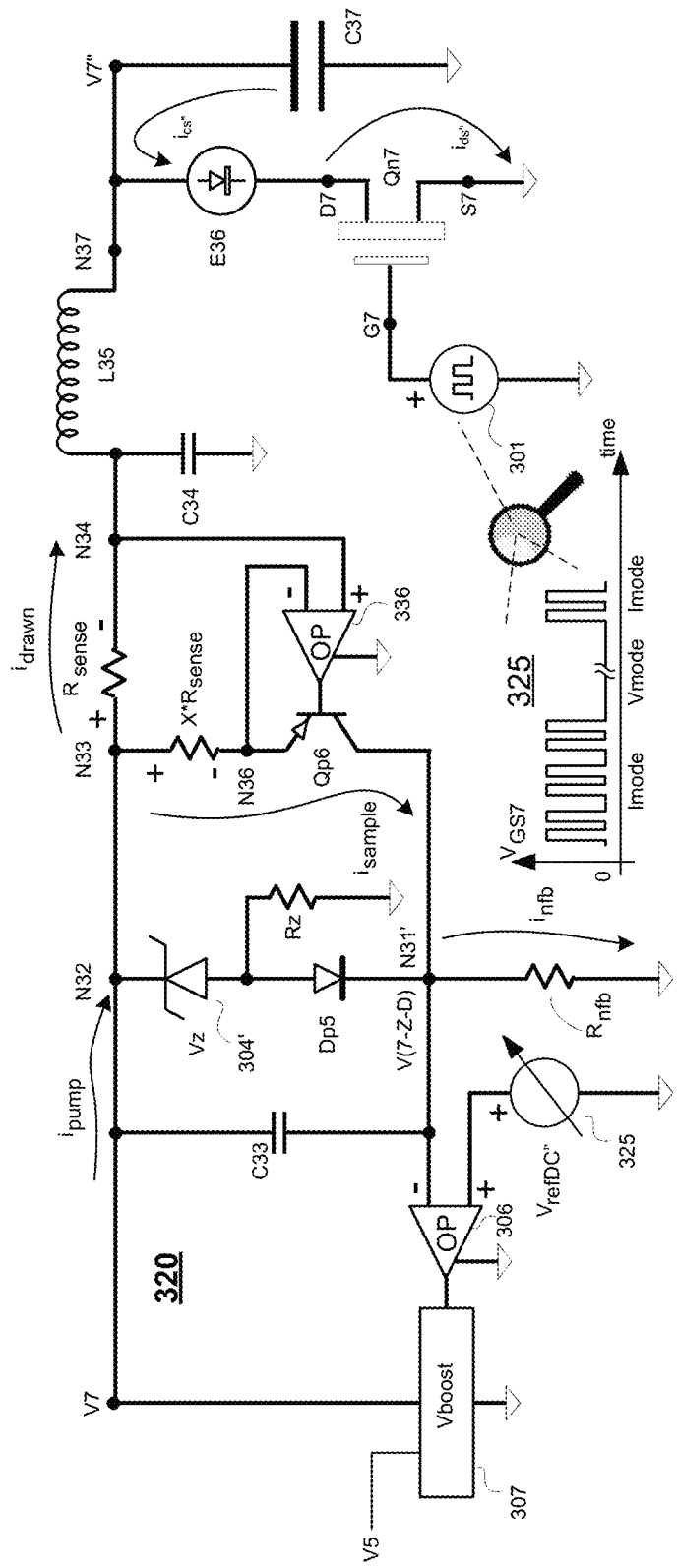
FIG. 3B is a schematic diagram of a second circuit having a dual mode power supply that can rapidly switch from a voltage regulating mode to a current regulating mode.

Referring to FIG. 3B, shown is a schematic diagram of a second circuit 320 that includes a multi-mode regulated power supply which is automatically switchable between a voltage regulating mode, a current regulating mode and a do nothing mode. Many of the components in FIG. 3B and their associated functions have been described in the above discussion of FIG. 3A and hence those descriptions will not be repeated here. The do nothing mode occurs when the voltage across capacitor C34 is greater than the target voltage established by components 325, 304' and Dp5 and therefore the Vboost module 307 is switched off and doing nothing.

One difference between the circuit 310 of FIG. 3A and the circuit 320 of FIG. 3B is that the target value for the voltage regulating mode is set higher. More specifically, in one embodiment, the target output DC voltage V7 is designed to be at 7.5 VDC where this value is predetermined to be slightly larger (e.g., 0.2V to 0.6V larger) than a largest voltage ever needed for driving whatever load (e.g., E36) is placed between nodes V7" and D7. When current regulating mode is in effect, the voltage at node N32 is below the voltage regulating mode target (e.g., 7.5V), for example at least 0.2V below, and the Zener diode 304' is caused to operate in a low current mode below that of its Zener breakdown current.

In the modified circuit of FIG. 3B, a diode Dp5 is inserted in series with the voltage drop providing element 304'. The nominal current, $i_{nfb}$ that flows through the voltage drop providing element 304', the inserted diode Dp5 and the negative feedback resistor $R_{nfb}$ when the target 7.5 VDC level of the voltage regulating mode is present at node N32 is picked such that diode Dp5 is just above its threshold voltage (e.g., 0.6V) and such that 6.9V appears across the voltage drop providing element 304' (here a Zener diode different from that, 304 of FIG. 3A). As long as this target condition is maintained (and assuming for the moment that no load current is being drawn by the pulsed load circuit (Qn7 and E36), the feedback loop for maintaining 7.5 VDC at node N32 will operate as before. If the voltage at node N32 is above the desired 7.5 VDC (of the given example), the Vboost module 307 is switched off and does nothing. Because the Zener diode 304' is not an ideal Zener diode, it exhibits some finite amount of leakage current when operating below its breakdown voltage. That sub-breakdown leakage current (typically on the order of microamps) is shunted to ground by shunting resistor Rz. The value of shunting resistor Rz is picked so as to not substantially affect the operation of the Zener diode 304' when it is in Zener breakdown mode and it passes a substantially higher level of current (typically on the order of milliamps). Thus, when a current regulating mode is activated (as shall be described below) and at least a major portion of the $i_{Pump}$ current is shunted into the $R_{sense}$ resistor (as shall be described below), the voltage at node N32 drops below the target 7.5 VDC level of the voltage regulating mode (where it is to be understood that 7.5 VDC is merely an example and other target values could be used), the Zener diode 304' switches into a non-breakdown mode (e.g., having a voltage drop less than 6.9V), the series diode Dp5 develops a voltage drop less than its threshold voltage (e.g., 0.6V) and thus the effective resistance of the downward current carrying branch of node N32 increases so as to inhibit current flow down that downward current carrying branch. The feedback current $i_{nfb}$ is instead drawn from the downward current carrying branch of node N33 as shall be described immediately below.

A PNP transistor Qp6 is added together with an emitter connected resistor, $X^*R_{sense}$ to reside in parallel with the voltage drop providing element 304' and the inserted diode Dp5. A current sensing resistor, $R_{sense}$ is inserted between nodes N33 and N34 to generate a sensing voltage corresponding to a drawn DC current, $i_{drawn}$ flowing between those nodes when the load E36 is drawing more than a negligible amount of current (e.g., more than a predetermined threshold level). The drawn load current $i_{cs''}$ of the load E36 can be one including AC components even though the drawn DC current, $i_{drawn}$ flowing through the sensing resistor, $R_{sense}$ (and through the choke coil L35) is substantially a direct current (DC). This is so because the load E36 can draw AC current components from the immediately adjacent charge storage capacitor C37. The drawn DC current, $i_{drawn}$ replenishes current into the charge storage capacitor C37. In one embodiment, the drawn DC current, $i_{drawn}$ is on the order of about 0.5 Amps DC whereas the drawn load current $i_{cs''}$ of the load E36 can include pulses of magnitude 1.0 Amps or higher.

When the drawn DC current, $i_{drawn}$ is flowing under condition of a known controlling drive pulse train (e.g., VGS7 during an Imode period as depicted in graph 325) the effective DC resistance of the circuitry to the right of node N34 can be estimated as $V_{N34}$ divided by $i_{drawn}$. For example if the drawn DC current, $i_{drawn}$ is on the order of about 0.5 Amps (or at another predetermined magnitude) and the voltage at node N34 is about 7.0 VDC (which is less than the voltage regulated target of 7.5 VDC), then the effective DC resistance of the circuitry to the right of node N34 is about 7.0/0.5 or 14 ohms. The resistance value of the emitter connected resistor, $X^*R_{sense}$ is picked to be X times that of the current sensing resistor, $R_{sense}$ where X is number greater than one and preferably greater than 100. The $X^*R_{sense}$ resistor is also referred to herein as a current diverting or current sampling resistor. The combined resistance of the $X^*R_{sense}$ resistor and the feedback resistor $R_{nfb}$ is picked to be a known multiple M of the combined resistance of the $R_{sense}$ resistor and the estimated effective resistance (e.g., 14 ohms; where M is greater than one) so that, when the drawn DC current, $i_{drawn}$ is flowing through sensing resistor, $R_{sense}$ and soon-described PNP transistor Qp6 is turned on at the time, a sampling current, $i_{sample}$ equal to a determinable function of the drawn DC current, $i_{drawn}$, flows through the series combination of $X^*R_{sense}$ and Qp6 and feedback resistor $R_{nfb}$. That function can be is $i_{sample} = V_{N33}/(X^*R_{sense} + R_{ce} + R_{nfb})$ where $R_{ce}$ is the collector to emitter resistance of the turned on PNP transistor Qp6. Here, $V_{N33} = i_{Drawn}*R_{sense} + V_{34}$ where $V_{34}$ is the voltage across AC suppressing capacitor C34. Thus, assuming that $V_{34}$ remains relatively constant during current regulating mode, $V_{N33}$ rises and falls in step with $i_{Drawn}$. In other words, if $i_{Drawn}$ grows too large, $i_{sample}$ correspondingly increases and shuts off the charge pump 307. The resistance of the current sampling resistor $X^*R_{sense}$ is picked so that when a maximum allowed amount of drawn DC current, $i_{drawn}$ is flowing through sensing resistor $R_{sense}$, (meaning the load E36 is receiving its intended amount of current flow), the voltage $V_{N33}$ at node N33 rises to a corresponding value (but one less than $V_{Target}$ of voltage regulating mode) and as a result the sampling current, $i_{sample}$ increases such that the voltage at feedback node N31' rises to equal $V_{refDC}$ and the booster 307 shuts off. Thus the amount of current delivered to the load E36 is limited. If less than the desired amount ($i_{Desired}$) of drawn DC current, $i_{drawn}$ is flowing through sensing resistor $R_{sense}$, the voltage $V_{N33}$ at node N33 drops, the sampling current, $i_{sample}$ decreases to a smaller value and as a result the voltage at feedback node N31' will be less than $V_{refDC}$. In turn, the charge pump 307 (the Vboost module) will be driven to generate additional pumping current $i_{Pump}$ for driving $i_{Drawn}$ up to its desired maximum level ($i_{Desired}$).

Contrastingly, when no current or a negligible amount of current flows through current sensing resistor, $R_{sense}$ its voltage drop is approximately equal to zero. Due to the Kirchhoff current laws, if there is an $i_{pump}$ current then present, that $i_{pump}$ current will primarily flow down one or both of the downward current carrying branches of nodes N32 and N33. If any part of the $i_{pump}$ current is then flowing down through $X^*R_{sense}$, a provided second Op amp 336 is driven to its logic high outputting state (because $X^*R_{sense}$ develops a positive input voltage for the Op amp 336 while $R_{sense}$ has approximate zero across it) and the associated PNP transistor Qp6 is then turned off (because its base is driven to a higher voltage than that of its emitter). That forces the sampling current, $i_{sample}$ down to zero. As a result, the provided second Op amp 336 remains driven to (latched to) its logic high outputting state and PNP transistor Qp6 remains turned off. The current regulating mode is therefore shut off when no current or a negligible amount of current flows through current sensing resistor, $R_{sense}$.

In one embodiment, the provided second Op amp 336 is biased to not output a logic low until its input voltage drops to be more negative than a predetermined negative threshold voltage. Thus the drawn DC current, $i_{drawn}$ (which generates a negative voltage across sensing resistor, $R_{sense}$) must exceed a corresponding threshold current level before the provided second Op amp 336 outputs a logic low and it responsively turns its associated PNP transistor Qp6 on. Therefore, depending on how the provided second Op amp 336 is biased, if the drawn DC current, $i_{drawn}$ is less than a predetermined threshold current level (e.g., below a pre-specified floor level, $i_{Floor}$), the associated PNP transistor Qp6 is kept shut off (not conducting between its emitter and collector) and sampling current, $i_{sample}$ is kept at zero. That prevents the circuit 320 from inadvertently entering its current regulating mode due to noise.

In the voltage regulating mode, the Vboost module 307 keeps pumping charge out to node N32 until the voltage at N32 reaches the voltage regulated target value (e.g., $V_{Target}$=7.5 VDC). At that point the Zener diode 304' having a breakdown voltage of 6.9V breaks down and the series silicon diode Dp5 becomes forward biased at 0.6V (where 6.9V+0.6V=7.5V) so that feedback current $i_{nfb}$ drives the voltage at node N31' equal to $V_{refDC}$ and then first Op amp 306 quickly shuts off the Vboost module 307 so that $i_{pump}$ ceases. The circuit 320 is then primed to feed current regulated power to the load E36 as soon as a train of drive pulses is delivered by control source 301.

When the first pulse of the train of drive pulses arrives, the charge storage capacitor C37 is pre-primed to the target voltage of the voltage regulating mode (e.g., to 7.5 VDC). MOSFET Qn7 is rapidly turned on and a first large surge of current flows through the load E36. The discharge of C37 cause the voltage at nodes V7", N37 and N34 to drop. An above threshold amount of current begins flowing through $R_{sense}$. The input voltage across the input terminals of second OP amp 336 goes negative ($V_{N34-N36}$<0) and responsively, the output of OP 336 goes low. PNP transistor Qp6 is then turned on because its base voltage drops below its emitter voltage (thus forward biasing the base/emitter PN junction). In that state, a sampling current $i_{sample}$ flows through the turned on transistor Qp6 and produces a slightly negative voltage drop as measured from node N36 up to node N33. That could potentially drive the second OP amp 336 into its on state. However, as long as an above threshold amount of drawn DC current, $i_{drawn}$ is being pulled by the load E36 (and it will be for most of the time that the pulse train of source 301 is present), the greater voltage across $R_{sense}$ will keep the second OP amp 336 in its off state and consequently will keep PNP transistor Qp6 turned on. The combined flow of significant drawn current $i_{Drawn}$ and less significant sampling current $i_{sample}$ will deprive the Zener diode 304' and diode Dp5 of at least some of the $i_{pump}$ current (if $i_{Pump}$ is present). That will assure that diode Dp5 goes subthreshold. Diode Dp5 then presents itself as a large resistance within the downward current carrying branch of node N32 and the system is thus rapidly locked out of being in a voltage regulating mode. The only current that substantially feeds the $i_{nfb}$ feedback current at that point is the sample sampling current $i_{sample}$. Therefore, after the first one or more pulses of the pulse train drain enough charge out of the charge storage capacitor C37, the above threshold DC current, $i_{drawn}$ begins flowing and the circuit 320 rapidly enters it its current regulating mode.

More specifically, when power MOSFET Qn7 is pulsed by source 301, a corresponding, low frequency current, $i_{drawn}$ begins flowing through sensing resistor, $R_{sense}$. A corresponding negative voltage is applied to the +input terminal of second OP amp 336, thus driving the output of that second operational amplifier 336 low and turning PNP transistor Qp6 on. The immediately resulting sampling current $i_{sample}$ as well as the larger DC current, $i_{drawn}$ are drawn from the right side of node N32, thus greatly reducing whatever then flowing $i_{pump}$ current is flowing down into the downward current carrying branch of node N32. This rapid reduction of current flowing down through the voltage drop providing element 304' and through the series inserted diode Dp5 shifts the state of diode Dp5 to below its threshold voltage (e.g., <0.6V) and causes diode Dp5 to switch into exhibiting a relatively large resistance (as well as a sub-threshold voltage drop). It also drives the Zener diode 304' below its breakdown voltage, where sub-breakdown leakage current is shunted off by resistor Rz. In response, the current contribution of the downward current carrying branch of node N32 to current moving through negative feedback resistor $R_{nfb}$ drops to essentially zero and only the sampling current $i_{sample}$ contributes to feedback current, $i_{nfb}$. The circuit 320 is therefore in a current regulating mode.

While the circuit 320 remains in current regulating mode (CRM), the power capacitor C37 will be charged to a voltage V7" at which, for the given temperature, and the then given I-V-T characteristics of the semiconductive light emitter E36, that emitter E36 will draw its temperature-determined current surges $i_{cs''}$ while the pulse train is being commanded to be fired and to which same voltage V7" the power capacitor C37 will be recharged by the replenishing DC current, $i_{Drawn}$ during the same duration (the Imode duration of graph 325) when the pulse train is being fired. The magnitudes of the current surges $i_{cs''}$ should be those specified by the manufacturer of the load (e.g., E36) for producing the desired, current-determined effect (e.g., the desired luminance power output). If $i_{cs''}$ and its total on time are known then the amount of charge drawn is $Q_{drawn}=i_{cs''}$ times total_on_time. The amount of charge to be replenished by the replenishing DC current, $i_{Drawn}$ during the same duration is substantially equal to $Q_{drawn}$ and can be calculated as the integral over time of $i_{Drawn}$ while the current regulating mode is on.

Although FIG. 3B shows only one combination of a power capacitor (e.g., C37) connected in parallel with one series set of a light emitter (e.g., E36) and its switching device (e.g., Qn7), it is within the contemplation of the present disclosure to have plural such driven combinations connected to node N37 where the respective pulse trains are fired at mutually exclusive and temporally spaced apart time periods.

Figure 3C:
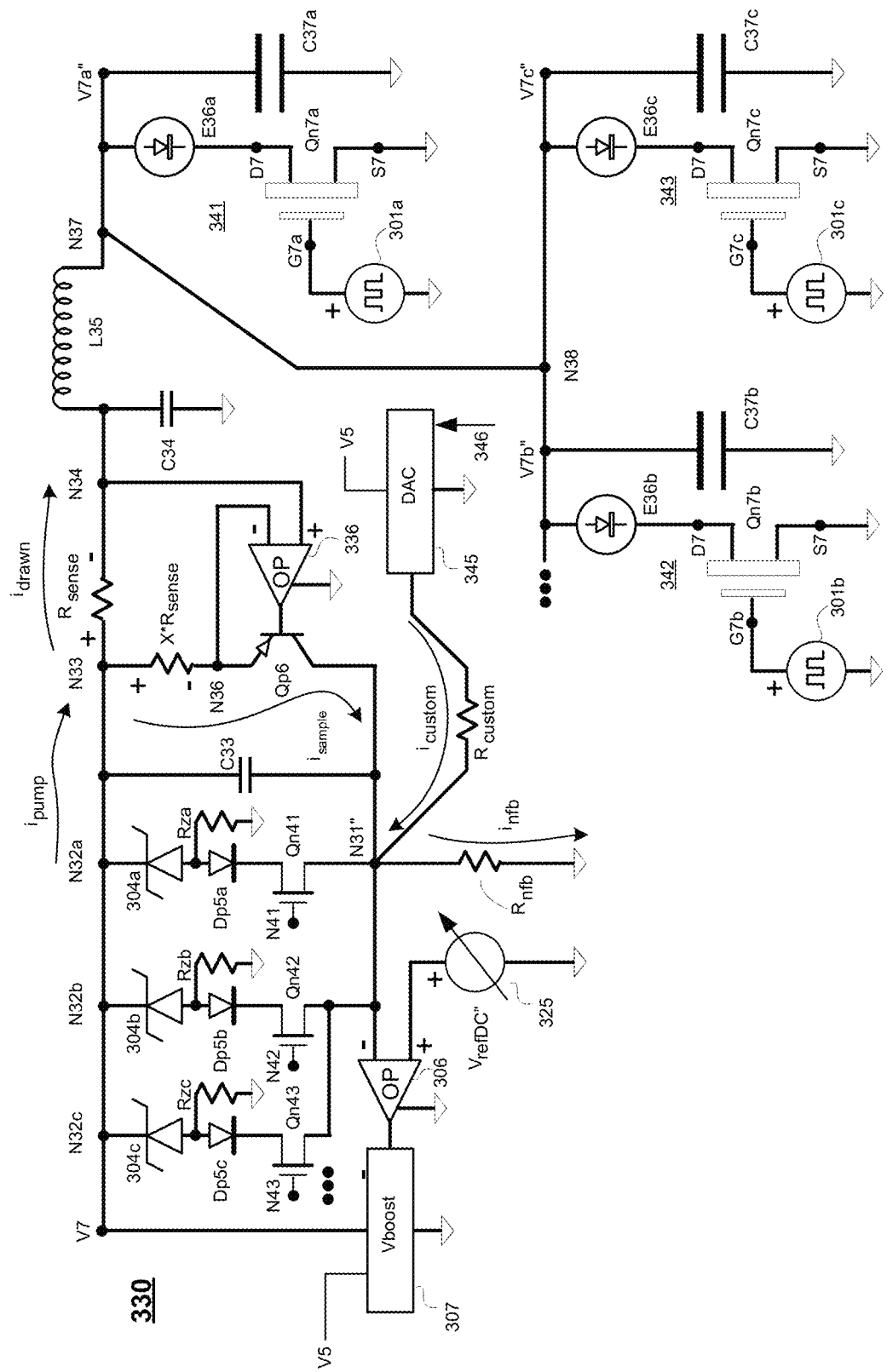
FIG. 3C is a schematic diagram of a third circuit having plural loads and a dual mode power supply with programmable variability.

FIG. 3C shows one possible example where plural combinations of power capacitor, light emitter and series switching device are driven by a common power regulator circuit 330. More specifically, in addition to a first combination 341 of a first power capacitor C37a and closely mounted series of a first light emitter E36a and corresponding switch Qn7a (where the close mounting is for minimizing the loop inductance), FIG. 3C shows the attachment to node N37 of a second combination 342 of a respective second power capacitor C37b and closely mounted series of a second light emitter E36b and corresponding switch Qn7b and of yet a third combination 343 of a respective third power capacitor C37c and closely mounted series of a third light emitter E36c and corresponding switch Qn7c, where yet further such combinations could be optionally added. Although not shown, each of combination circuits 341, 342, 343, etc. could additionally be provided with its own RF choke coil and/or low pass capacitor similar to the illustrated L35 and C34. It is understood that respective pulse train sources 301a, 301b, 301c are preferably fired at mutually exclusive times. The $R_{sense}$ resistor automatically detects when the start of firing of each mutually exclusive pulse train occurs and then automatically switches the circuit 330 into current regulating mode (CRM). In one embodiment, the switch over to current regulating mode takes about 105 microseconds (µs) or less.

For the respective, mutually exclusive times and according to one option, different ones of a Zener in series with a branch controlling diode are activated by digitally activating a respective MOSFET or transmission gate (latter not shown), namely, at a first time (which includes at least one firing duration and one non-firing duration—see graph 325 of FIG. 3B) switching NMOS transistor Qn41 into a conductive state so as to bring into play a corresponding first Zener diode 304a and its branch controlling diode Dp5a; at a second and mutually exclusive time (which includes at least one firing duration and one non-firing duration) switching NMOS transistor Qn42 into a conductive state so as to bring into play a corresponding second Zener diode 304b and its branch controlling diode Dp5b; and at a third and mutually exclusive time switching NMOS transistor Qn43 into a conductive state so as to bring into play a corresponding third Zener diode 304c and its branch controlling diode Dp5c. The Zener break down voltages and/or other I-V-T characteristics of the respective Zener diode 304a,b,c and/or their respective branch controlling diodes Dp5a,b,c may be different from one another. One or more of the alternatingly activated Zener diode branches may additionally include a leakage shunting resistor $R_{za,b,c}$. Optionally, the Zener diode of one of the illustrated branches of respective nodes N32a, N32b, N32c may be replaced by a resistor or an additional branch may be added with such a replacement resistor where selective activation of that branch drives the feedback node N31" to a voltage level above $V_{refDC}$ so as to initially keep the Vboost module 307 turned off during startup. Instead of or in addition to the illustrated NMOS transistors, Qn41-Qn43, PMOS transistors could have been placed in series above the Zener diodes where the gates of those PMOS transistors (not shown) would be driven to logic low (e.g., ground) to selectively turn them on according to a mutually exclusive basis.

Additionally, FIG. 3C shows the optional provision of a custom current injector circuit (e.g., DAC 345 and resistor $R_{custom}$) that is configured to selectively inject into (or conversely draw out of) the negative feedback node N31" a desired amount of current $i_{custom}$. The programmably controlled DAC 345 may have an analog voltage output or an analog current output, and in the case of the latter, resistor $R_{custom}$ may be replaced by a short. The digital control input signal 346 of the DAC may command different levels of injected (or withdrawn) current for negative feedback node N31" so as to thereby bias that node N31" at a respectively appropriate and predetermined voltage for the case when any of combination circuits 341, 342 and 343 is used and/or for the case when any of the different Zener diode branch circuits is used. On one hand this modification provides the illustrated power supply 330 with greater flexibility. On the other hand, it adds components, size, cost and complexity as compared to the simpler configuration of FIG. 3B.

Figure 3D:
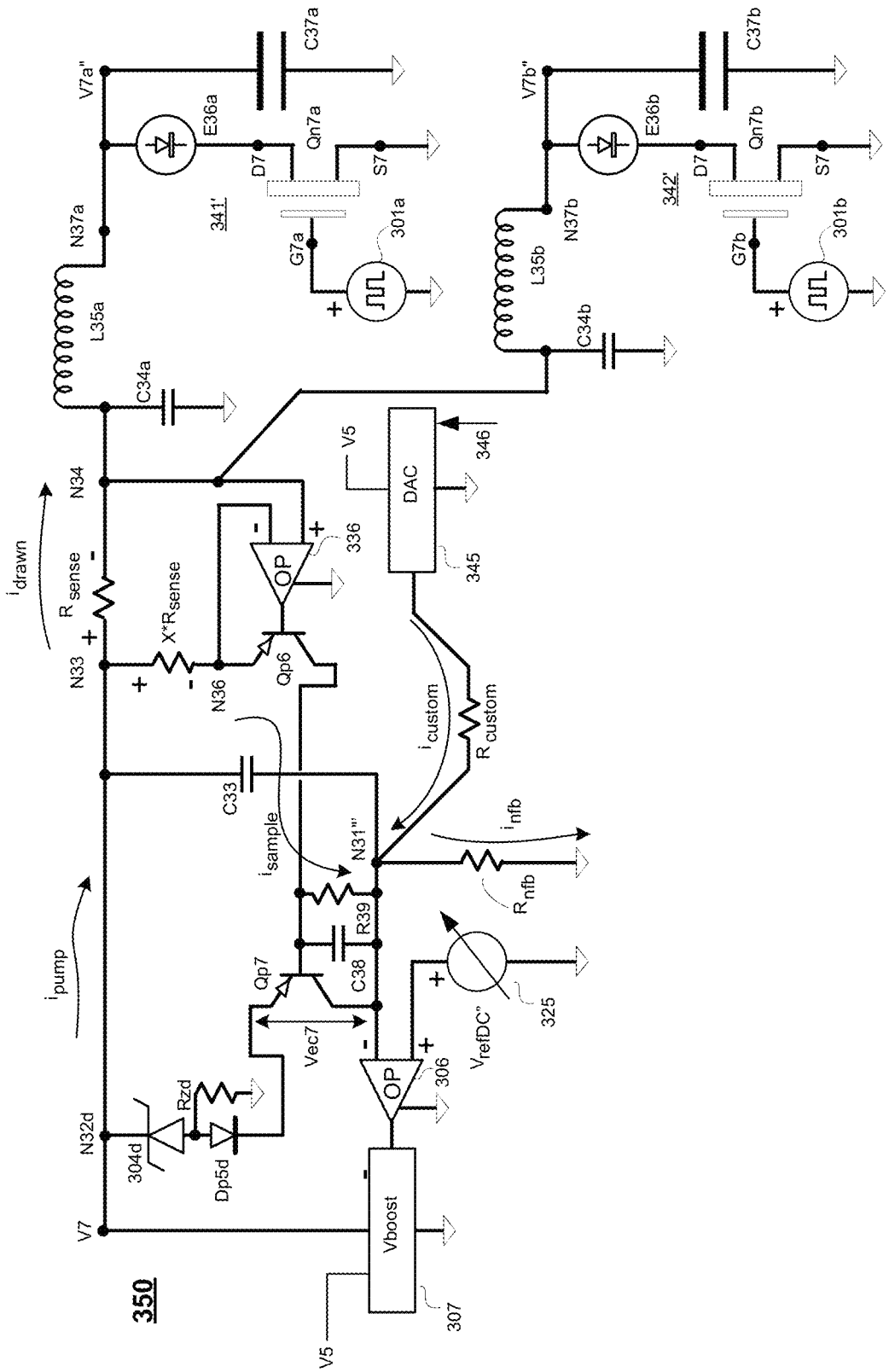
FIG. 3D is a schematic diagram of a fourth circuit having plural loads and a dual mode power supply with programmable variability including fine tuning of its voltage regulating mode voltage.

FIG. 3D illustrates yet another configuration, 350. Here, a second PNP transistor Qp7 is added between diode Dp5d and the negative feedback node N31'''. As long as diode Dp5d is forward biased and, the voltage drop between node N32d and feedback node N31''' is large enough to keep Qp7 forward biased, feedback current flows out of the collector of the second PNP transistor Qp7 to establish the voltage across resistor Rnfb as equal to the boosted voltage V7 minus the drop across Zener 304d, minus the drop across diode Dp5d and minus the emitter-collector drop ($V_{ec7}$) of PNP transistor Qp7. The latter drop, $V_{ec7}$ across PNP transistor Qp7 can be set by fine tuning its base to collector biasing resistor R39. Capacitor C38 provides biasing stability. Transistor Qp7 shuts off when the first PNP transistor Qp6 turns on. The turning on of first PNP transistor Qp6 happens when a pulse train is fired and corresponding current $i_{Drawn}$ passes through resistor $R_{sense}$ to thus drive the positive input terminal (+) of second OP amp 336 negative relative to its negative input terminal (−). At that point the circuit 350 is automatically switched from voltage regulating mode to current regulating mode. The circuit 350 automatically switches back to voltage regulating mode when $i_{Drawn}$ stops flowing.

While a number of variations have been illustrated, these should not be viewed as limiting. It is within the contemplation of the present disclosure to employ other configurations for automatically switching from voltage regulating mode to current regulating mode when regulated current flow is desired and then back to voltage regulating mode when the regulated current flow is no longer needed and a regulated voltage is instead then desired.

FIG. 4A is a flow chart showing a sequence of events 400 in which an automatic switch over from voltage regulating mode to current regulating mode may be desirable followed by a switch back to voltage regulating mode. At step 402, it is determined that voltage regulating mode (e.g., a $V_{Target}$ voltage maintaining mode) is now desirable (e.g. for fast responding to the first pulse of the pulse train) and the power regulator circuit is automatically placed in voltage regulating mode (VRM).

At step 404, it is automatically detected that there has been a change of circumstances (e.g., the pulse train has begun firing) where current regulating mode is more desirable for replenishing a charge storing device (e.g., power capacitor C37) and the power regulator circuit is automatically placed in current regulating mode. In one embodiment, a control current (e.g., $i_{sample}$) which is a function of a working current ramps up to a predetermined top value, $i_{Top}$ (see also FIG. 4B) indicative of the working current having reached its allowed maximum.

At step 406, it is automatically detected that the need for current regulating mode (CRM) has ceased, for example because the light emission pulse train has ended. Control is then returned to step 402 so as to maintain a pre-primed voltage (e.g., $V_{Target}=7.5V$).

FIG. 4B is a current versus time graph in which piece wise linear segments are used to schematically indicate what is happening. The actual plot may have nonlinear segments. At time point t0 the system is sitting in a voltage regulating state and it could be doing nothing if a predetermined target voltage value (e.g., 7.5V) is present or exceeded. At time point t1 the system detects a change of circumstances, such as detecting that a high power pulse train is being commanded and the system automatically determines that it is time to switch over into current regulating mode. The switch over occurs at time point t2. Between time points t2 and t3, the system is testing a control current (e.g., $i_{sample}$) which is a function of a larger operating current (e.g., $i_{Drawn}$). At time point t3 the system automatically detects that a predetermined target value ($i_{Top}$) has been reached by the tested control current (e.g., $i_{sample}$). At time point t4 the system automatically turns down or shuts off its charge pump (e.g., 307). At time point t5 the system is automatically testing for a next change of circumstance event that warrants turning up or turning on its charge pump (e.g., 307). In one embodiment, because there is a larger voltage across capacitor C37 than the first time, a smaller amount of time is need to bring the control current (e.g., $i_{sample}$) back to the top level ($i_{Top}$).

FIG. 4C is a voltage versus time graph in which piece wise linear segments are used to schematically indicate what is happening. The actual plot may have nonlinear segments. At time point t0 the system is sitting in a voltage regulating state and it could be doing nothing if a predetermined floor voltage value $V_{Target}$ is present or exceeded. If a capacitor stored voltage (e.g., $V_{C37}$) drops below the predetermined floor voltage value $V_{target}$, a booster is activated to bring it back up to the predetermined floor voltage value $V_{target}$. At time point t1 the system detects a change of circumstances, such as detecting that a high power pulse train is being commanded and the system automatically determines that it is time to switch over into current regulating mode. The switch over occurs at time point t2. Although it takes a finite amount of time to switch over, for example about 100 ps, and during that time the voltage applied to the load (E36) includes an over-voltage ($V_{Target}$) that is greater than an operating one specified for the load, most loads can handle a short duration of operating in over-voltage mode. In particular, because the application of the over-voltage ($V_{Target}$) occurs at the very beginning of the pulse train where the load had had time to dissipate some of the thermal energy from the previous pulse train, the short duration application of the over-voltage ($V_{Target}$) generally does not damage the load. Between time points t2 and t3, the system is pumping a replenishing current into a discharged capacitor (e.g., C37) so that the voltage of that capacitor begins to rise. At the same time the system is testing a control current (e.g., $i_{sample}$) which is a function of a larger replenishing current (e.g., $i_{Drawn}$). At time point t3 the system automatically detects that a predetermined current mode top value (i$_{Top}$) has been reached by the tested control current (e.g., $i_{sample}$). At time point t4 the system automatically turns on or up its charge pump because the tested control current (e.g., $i_{sample}$) is below the desired top value ($i_{Top}$). At time point t6 the system is back in voltage regulating mode (VRM).

FIG. 4D depicts I-V-T characteristic curves for an exemplary semiconductive light emitter (e.g., laser diode) in the form of three exemplary temperature plots for respective temperatures T1, T2 and T3. Tilted current plot $i_{Lum0}$ represents the currents needed for realizing a pre-specified luminance output at the different temperatures T1, T2 and T3. Non-tilted line $i_{constant}$ represents a constant current value for where $i_{Lum0}$ crosses with the T2 voltage versus current curve. $V_{T2}$ is the voltage across the exemplary semiconductive light emitter (e.g., laser diode) when its current is $i_{constant}$. $V_{T3}$ is the voltage across the exemplary semiconductive light emitter when its current is $i_{Lum0}$.

As can be seen the schematic depiction of FIG. 4D, substantially different voltages (e.g., $V_{T2}$, $V_{T3}$) need to be maintained across the light emitter (e.g., laser diode) at respective different temperatures (e.g., T2, T3) if a predetermined output luminance value (e.g., Lum0) is to be maintained. On the other hand, if a substantially constant current (e.g., $i_{constant}$) is used over the different temperatures, the predetermined output luminance value (e.g., Lum0) can be substantially maintained with little variance. The above described, multi-mode power regulator scheme can be used to automatically and rapidly switch into current controlled mode when needed. The current controlled mode not only takes care of temperature variances, but also of small resistance change issues. For example in FIG. 3C, an extra resistance might be introduced by the inclusion of the PCB trace between nodes N37 and N38. Because the load drive currents are relatively large, even a small added series resistance $R_{N37-38}$ can have significant effect. Aside from trace N37-38, other examples of small but insertable series resistances can include connector contact resistances, changes due to corrosion and/or vibration, changes due to replacement cable resistances, etc. Current regulated mode is tolerant of such insertable series resistances because it drives towards a predetermined current target not towards a predetermined voltage value. Thus the current mode using power regulator can at substantially a same time (e.g., simultaneously) compensate for temperature changes and inserted series resistances which come to be inserted over time, for example due to contact corrosion Although FIGS. 2B-2C and 3A depict just a single combination of an IGFET driven laser emitter and a corresponding fast charge and discharge drive circuit for the one IGFET, it is to be understood that the PCB 161 of FIG. 1A (for example) can have two or more such combinations mounted thereon and thus the circuitry of one or more of FIGS. 2B-2C and FIG. 3A can be many times repeated on the PCB without unduly adding many large components to the PCB. For example, the multi-load configurations of FIGS. 3C-3D may be used. Accordingly, an elegant and small form factor modification is provided for reducing the risk of inconsistent output luminance due to temperature drift or over-time contact corrosion. This is done without significantly increasing system weight, cost, size of complexity.

Figure 5:
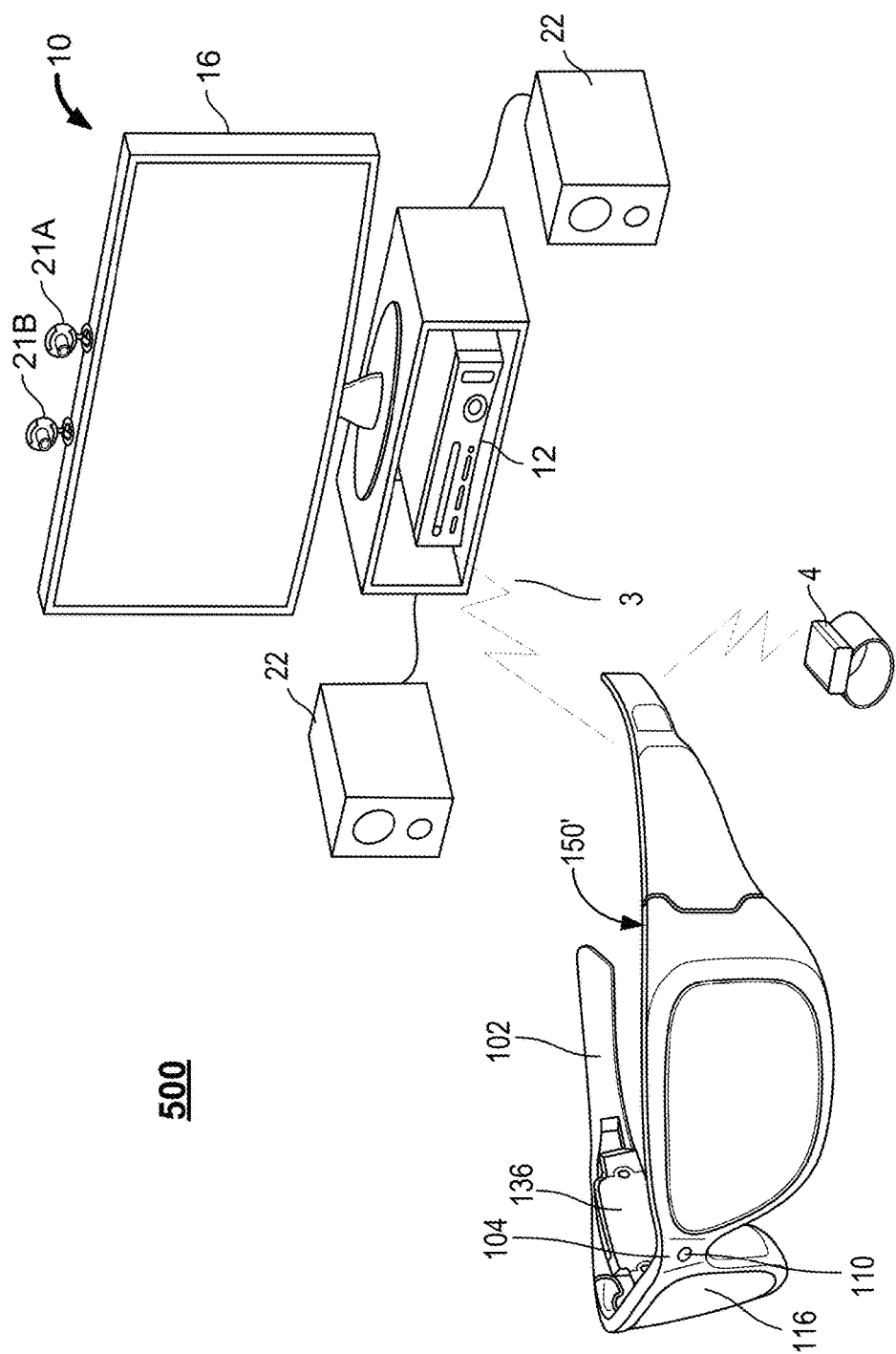
FIG. 5 is a block diagram depicting example components of an embodiment of a see-through, mixed reality display system with an on-board TOF sub-system.

FIG. 5 is a block diagram depicting example components of one embodiment 500 of a see-through, mixed reality display device using the high powered components pulse width clamping aspect of the present disclosure. The illustrated system 500 includes a see-through display device as a near-eye, head mounted display device 150' in communication with a user-worn (e.g., belt-worn, or arm-worn) processing unit 4 via wireless link 3. Head mounted display device 150', which in one embodiment is in the shape of eyeglasses 116 in a frame 102, is worn on the head of a user so that the user can see through a display, embodied in this example as a separate display optical system for each eye, and thereby providing binocular vision including an actual direct view of the space in front of the user.

The use of the term "actual direct view" refers to the ability to see real world objects directly with the human eye through the lenses (e.g., 116) of the HMD 150', rather than seeing only created image representations of such objects. For example, looking through glass at a room allows a user to have an actual direct view of the room, while viewing a video of a room on a television is not an actual direct view of the room. Based on the context of executing software, for example, a gaming application, the system can project images of virtual objects (e.g., monster 17 of FIG. 1A), sometimes referred to as virtual images, on the display that are viewable by the person wearing the see-through display device while that person is also viewing real world objects through the display.

Frame 102 provides a support for holding elements of the system in place as well as a conduit for electrical connections. In this embodiment, frame 102 provides a convenient eyeglass frame as support for the elements of the system discussed further below. In other embodiments, other support structures (e.g., an around the head adjustable band) can be used. An example of such a structure is a visor or goggles. The frame 102 includes a temple or side arm for resting on each of a user's ears. The visible temple side of 102 is representative of an embodiment of the right temple and includes control circuitry 136 for the display device 150'. Nose bridge 104 of the frame includes a microphone 110 for recording sounds and transmitting audio data to processing unit 4. Although not shown in FIG. 5, the C-shaped PCB 161 of FIG. 1A may be mounted just above the microphone 110 so as to allow for unimpeded receipt of audio signals while at the same time providing for accurate depth determination with use of TOF techniques. The provided depth determination capability may be used to identify various hand gestures made by the wearer of the HMD 150'.

In one embodiment, processing unit 4 is worn on the user's wrist and includes some of the computing power used to operate see-through head-mounted display 150'. Processing unit 4 may communicate wirelessly (e.g., WiFi, Bluetooth, infra-red, or other wireless communication means) to one or more hub computing systems 10.

Hub computing system 10 may include a computer, a gaming system or console, or the like. According to an example embodiment, the hub computing system 10 may include hardware components and/or software components such that hub computing system 10 may be used to execute applications such as real-time, multi-user gaming applications, non-gaming applications, or the like. In one embodiment, hub computing system 10 may include a processor such as a standardized processor, a specialized processor (e.g., one including high speed graphics support firmware), a microprocessor, or the like that may execute instructions stored on a processor readable storage device for performing the processes described herein.

Hub computing system 10 further includes one or more capture devices, such as capture devices 21A and 21B. In other embodiments, more or less than two capture devices can be used to capture the room or other physical environment of the user.

Capture devices 21A and 21B may, for example, include cameras that visually monitor one or more users in the local and surrounding space and capture poses, gestures and/or movements performed by the one or more users, as well as the structure of the surrounding space. The captured real world data may be analyzed, and tracked to perform one or more controls or actions within an application and/or animate an avatar or on-screen character. An application may be executing on hub computing system 10, the worn display device 150', and/or on a non-worn display 16 and/or on a mobile device 5 as discussed below or a combination of these.

Hub computing system 10 may be connected to an audiovisual device 16 such as a television, a monitor, a high-definition television (HDTV), or the like that may provide game or application visuals. For example, hub computing system 10 may include a video adapter such as a graphics card and/or an audio adapter such as a sound card that may provide audiovisual signals associated with the game application, non-game application, etc. The audiovisual device 16 may receive the audiovisual signals from hub computing system 10 and may then output the game or application visuals and/or audio associated with the audiovisual signals. According to one embodiment, the audiovisual device 16 may be connected to hub computing system 10 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 10 is connected to external speakers 22.

Furthermore, as in the hub computing system 10, gaming and non-gaming applications may execute on a processor of the mobile device 4 which user actions control or which user actions animate an avatar as may be displayed on a display 7 of the mobile device 4. The mobile device 4 also provides a network interface for communicating with other computing devices like hub computing system 10 over the Internet or via another communication network via a wired or wireless communication medium. For example, the user may participate in an online gaming session with other mobile device users and those playing on more powerful systems like hub computing system 10. Examples of hardware and software components of a mobile device 4 such as may be embodied in a smartphone or tablet computing device. Some other examples of mobile devices 4 are a laptop or notebook computer and a netbook computer.

Figure 6:
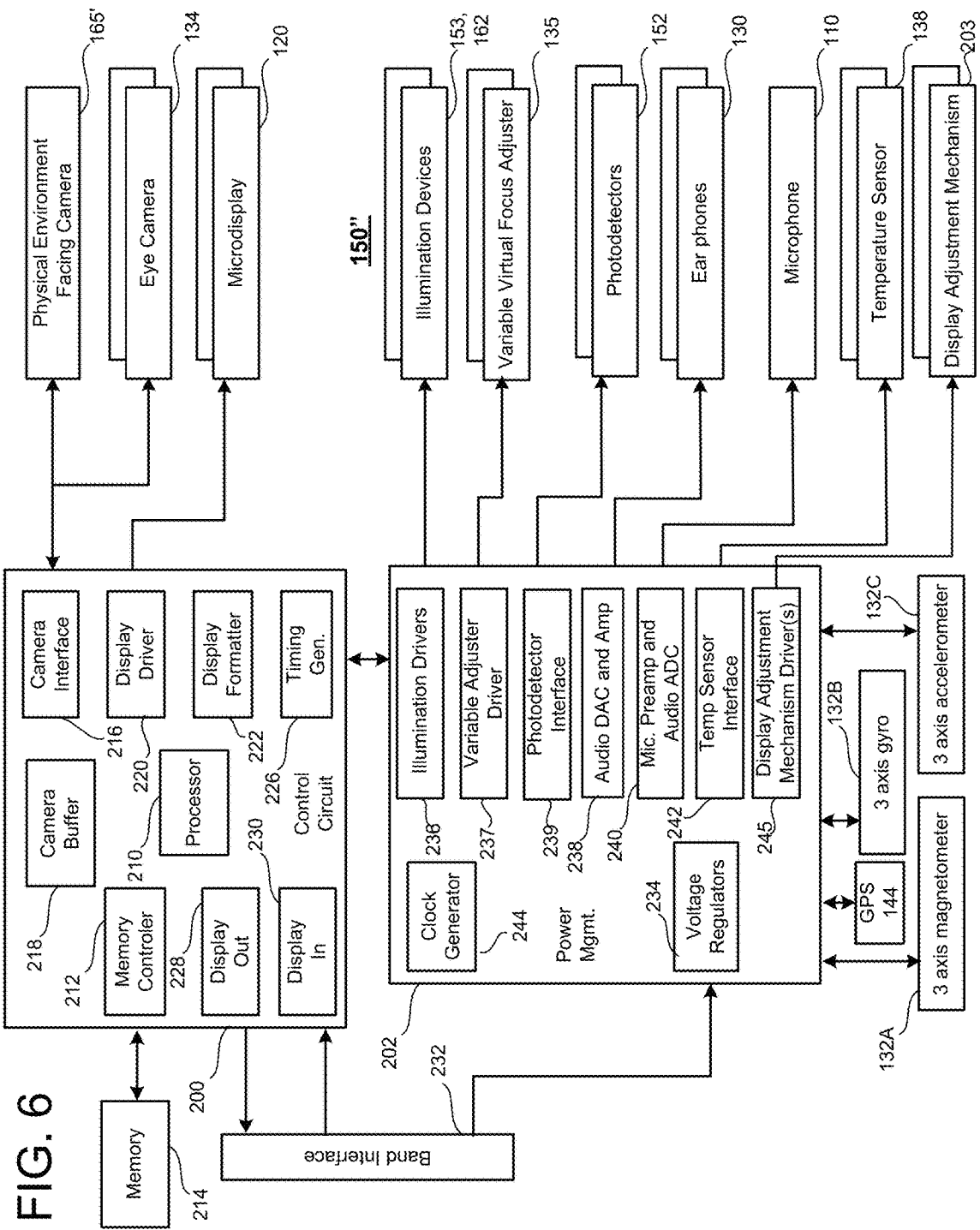
FIG. 6 is a block diagram of one embodiment of hardware and software components of a see-through, near-eye display system as may be used with one or more embodiments.

FIG. 6 is a block diagram of one embodiment of hardware and software components of a see-through, near-eye display unit 150 as may be used with one or more embodiments. In this embodiment, see-through head-mounted display 150", receive instructions about a virtual image from processing unit 210 and provides the sensor information back to processing unit 210. Software and hardware components which may be embodied in a processing unit 210, will receive the sensory information from the display device 150" and may also receive sensory information from hub computing device 10. Based on that information (including depth information obtained from the TOF sub-system), processing unit 210 will determine where and when to provide a virtual image to the user and send instructions accordingly to the control circuitry 136 of the display device 150".

Note that some of the components of FIG. 6 (e.g., eye cameras 134, variable virtual focus adjuster 135, photodetector interface 139, micro display 120, illumination device 153 or illuminators, earphones 130, temperature sensor 138, display adjustment mechanism 203) are shown in shadow to indicate that there are two of each of those devices, one for the left side 14L and one for the right side 14R of head mounted display device 150". FIG. 6 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210.

Cameras interface 216 provides an interface to the physical environment facing camera 165' and each eye camera 134 and stores respective images received from the cameras 165', 134 in camera buffer 218 (which includes a Z depth data storing portion and an RGB plane image storing portion for the case of the depth camera 165'). Display driver 220 will drive microdisplay 120. Display formatter 222 may provide information, about the virtual image being displayed on microdisplay 120 to one or more processors of one or more computer systems, e.g. 20, 12, 210 performing processing for the augmented reality system. Timing generator 226 is used to provide timing data for the system. Display out 228 is a buffer for providing images from physical environment facing cameras 113 and the eye cameras 134 to the processing unit 4. Display in 230 is a buffer for receiving images such as a virtual image to be displayed on microdisplay 120. Display out 228 and display in 230 communicate with interface 232 which is an interface to processing unit 4.

Power management circuit 202 includes voltage regulators 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4 via band interface 232 and provides that power to the other components of head mounted display device 150. Illumination drivers 236 provide the IR lightsource drive signals for illumination devices 153, 162 as described above. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 indicating which represent adjustment amounts of movement in at least one of three directions. Power management unit 202 also provides power and receives data back from three axis magnetometer 132A, three axis gyro 132B and three axis accelerometer 132C. In one embodiment, the power management circuit 202 includes a recharging management module (not shown) which allows the small on-board batteries (not shown, e.g. 3 VDC, 4.5 VDC) to be recharged in a detachably wired or wireless manner from an external source.

The variable adjuster driver 237 provides a control signal, for example a drive current or a drive voltage, to the adjuster 135 to move one or more elements of the microdisplay assembly 173 to achieve a displacement for a focal region calculated by software executing in the processing unit 4 or the hub computer 10 or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 receives performs any analog to digital conversion needed for voltage or current readings from each photodetector, stores the readings in a processor readable format in memory via the memory controller 212, and monitors the operation parameters of the photodetectors 152 such as temperature and wavelength accuracy.

FIG. 7 is a block diagram of one embodiment of the hardware and software components of a processing unit 4 associated with a see-through, near-eye display unit. The mobile device 4 may include this embodiment of hardware and software components as well or similar components which perform similar functions. FIG. 7 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, see-through head-mounted display 150 via band interface 302 and band interface 232, display in buffer 338 in communication with see-through head-mounted display 150 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, etc. The USB port can be used to dock the processing unit 4 to hub computing device 10 in order to load data or software onto processing unit 210 as well as charge processing unit 4. In one embodiment, CPU 320 and GPU 322 are the main workhorses for determining an XYZ mapping of the user's environment (including based on TOF determinations) and of where, when and how to insert images into the view of the user.

Power management circuit 306 includes clock generator 360, analog to digital converter 362, battery charger 364, voltage regulators 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 may provide recharging power to the smaller on-board batteries of the display device 150. The voltage regulator may provide one or more of specific voltages for powering the HMD 150 including for example a 3.0 VDC signal and a 4.5 VDC signal.

The figures above provide examples of geometries of elements for a display optical system which provide a basis for different methods of determining Z-depth as discussed above. The method embodiments may refer to elements of the systems and structures above for illustrative context; however, the method embodiments may operate in system or structural embodiments other than those described above.

The example computer systems illustrated in the figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

What has been disclosed therefore is a method of supplying power to a load that episodically becomes connected to receive current from a power supply, the method comprising: (a) automatically detecting if the load is drawing on a time averaged basis, more than a predetermined first amount of average current, and if not responsively causing a charge storage device to be charged to a predetermined first voltage using a voltage controlled mode of a multi-mode regulated power supply, where the load becomes connected to the charge storage device when the load becomes episodically connected to receive current from the multi-mode regulated power supply; (b) in response to detecting that the load is on the time averaged basis drawing more than the predetermined first amount of average current, automatically switching the multi-mode regulated power supply to a current regulating mode to thereby limit the amount of average current received by the load to a second amount of average current greater than the first amount of average current; and (c) in response to detecting that the load is no longer on the time averaged basis drawing more than the predetermined first amount of average current, automatically switching the multi-mode regulated power supply to the voltage controlled mode to thereby cause the charge storage device to again be charged to the predetermined first voltage. The method may be one further comprising automatically switching the multi-mode regulated power supply back to a current regulating mode upon again detecting that the load is on the time averaged basis again drawing more than the predetermined first amount of average current. The method may be one wherein the charge storage device includes a capacitor; and the load includes a temperature and voltage sensitive device whose output behavior is more so determined by current levels that it receives rather than by its temperature and by corresponding load voltages that develop across the temperature and voltage sensitive device. The method may be one wherein the temperature and voltage sensitive device includes a semiconductive light emitter whose output luminance is more so determined by current levels that it receives rather than by its temperature and by corresponding load voltages that develop across the semiconductive light emitter. The method may be one wherein the semiconductive light emitter is one that needs to receive an episodic surge of current of 0.5 Ampere or more to produce an application adequate output luminance. The method may be one wherein the load is connected in series with a semiconductive switching device and the load episodically becomes connected to receive current from the multi-mode regulated power supply due to episodic closing and opening of the semiconductive switching device, the method further comprising: causing the semiconductive switching device to close and open, the closing of the semiconductive switching device occurring in 10 nanoseconds (10 ns) or less. The method may be one wherein the causing of the charge storage device to be charged to the predetermined first voltage when using the voltage controlled mode comprises: generating a feedback voltage that is predetermined amount less than an output voltage produced by the multi-mode regulated power supply; applying the feedback voltage to a feedback resistor; comparing the feedback voltage with a reference voltage; and in response to detecting that feedback voltage is equal to or greater than the reference voltage, deactivating a voltage booster that generates the output voltage produced by the multi-mode regulated power supply. The method may be one wherein the generating of the feedback voltage comprises: passing a feedback current through the feedback resistor; and passing the feedback current through a voltage sensitive device having a threshold voltage, where the voltage sensitive device switches from a relatively low resistance mode to a substantially higher resistance mode when voltage across the voltage sensitive device drops below the threshold voltage; wherein during the voltage regulating mode, the voltage sensitive device operates just above its threshold voltage; and wherein the load is coupled so as to divert current away from the voltage sensitive device when the load draws on the time averaged basis, more than the predetermined first amount of average current, where the diverting away of the current causes the voltage sensitive device to operate below its threshold voltage and thus in its substantially higher resistance mode. The method may be one wherein the switching of the multi-mode regulated power supply to the current regulating mode comprises: producing a sampling current that is representative of a magnitude of the on the time averaged basis drawn current of the load; and passing the sampling current through the feedback resistor. The method may be one wherein causing the load to become episodically connected to receive current from the multi-mode regulated power supply by commanding a firing of a rapid train of pulses each have a pulse duration of 50 nanoseconds or less.

What has been disclosed therefore includes a power supply configured to supply power to a load that episodically becomes connected to receive current from the power supply, the power supply having a voltage regulating mode and a current regulating mode and comprising: a voltage maintaining portion that is configured to be active when the voltage regulating mode is in effect, the voltage maintaining portion including a subtractive circuit that subtracts a predetermined first voltage magnitude from a voltage present at an output sampling node to thereby produce a first feedback voltage which is applied to a feedback resistor; a comparator coupled to the feedback resistor so as to receive the first feedback voltage and configured to compare the first feedback voltage with a predetermined first reference voltage; and a booster configured to pump charge to the output sampling node in response to the comparator indicating that the first feedback voltage is less than the first reference voltage; and a current limiting portion that is configured to automatically become active when an over-time averaged current drawn to the load is detected to exceed a predetermined first current magnitude, the drawn averaged current being one drawn to the load when the load is episodically connected to receive current from the power supply; wherein the voltage maintaining portion is configured to automatically stop producing the first feedback voltage when the drawn averaged current exceeds the first current magnitude; and wherein the current limiting portion is configured to supply a sampling current to the feedback resistor when the current limiting portion becomes active, the sampling current being representative of a magnitude of the drawn averaged current and causing a second feedback voltage to develop at the feedback resistor such that the booster stops pumping charge to the output sampling node in response to the comparator indicating that the second feedback voltage is equal to or greater than the first reference voltage. The power supply may be one wherein the voltage maintaining portion is configured to automatically again produce the first feedback voltage when the drawn averaged current ceases to exceed the predetermined first current magnitude. The power supply may be one wherein the load is connected to a charge storage device so as to be able to receive pulses of current from the charge storage device when the load episodically becomes connected to receive current from the power supply; the charge storage device is connected to the power supply so as to store a maintained output voltage developed by the power supply when the voltage regulating mode is in effect. The power supply may be one wherein the charge storage device includes a capacitor; the load is configured to draw pulses of current each of 0.5 Ampere or more from the capacitor; and the booster that pumps charge to the output sampling node has sufficient charge producing capability to replenish over a duration of two pulses the drawn amount of charge that the load has drawn as pulses of current from the capacitor. The power supply may be one wherein the subtractive circuit comprises a Zener diode in series with a semiconductive diode, the semiconductive diode having a predetermined threshold voltage; the subtractive circuit is configured to bias the semiconductive diode just above its predetermined threshold voltage when the voltage regulating mode is in effect; and the current limiting portion is connected so as to deprive the semiconductive diode of at least some of its biasing current when the drawn averaged current exceeds the first current magnitude, thus shifting the semiconductive diode below its predetermined threshold voltage and causing the semiconductive diode to decrease in conductivity. The power supply may be one wherein the current limiting portion includes an operational amplifier having a first input terminal coupled to a current sensor through which the drawn averaged current passes and a second input terminal coupled to a current diverting resistor through which the sampling current flows. The power supply may be one wherein the current limiting portion further includes a bipolar transistor interposed in series between the current diverting resistor and the comparator, a base terminal of the bipolar transistor being coupled to an output terminal of the operational amplifier. The power supply may be one further comprising: a digitally controllable current supply operatively coupled to the feedback resistor so as to perform at least one of, injecting a digitally defined current into the feedback resistor, drawing off a digitally defined current from a node of the feedback resistor and in response to a supplied digital command, not injecting current into the feedback resistor or drawing current out from the node of the feedback resistor.

What has been disclosed therefore includes a time of flight (TOF) determining system comprising: a semiconductive light emitter; a capacitor connected to the light emitter such that the light emitter can draw high powered surges of current from the capacitor, the surges having a magnitude of 0.5 Amperes or more; and a power supply configured to supply a charge replenishing current to the capacitor after the light emitter has drawn the high powered surges of current from the capacitor, the power supply having a voltage regulating mode and a current regulating mode and including: a voltage maintaining portion that is configured to be active when the voltage regulating mode is in effect, the voltage maintaining portion including a subtractive circuit that subtracts a predetermined first voltage magnitude from a voltage present at an output sampling node to thereby produce a first feedback voltage which is applied to a feedback resistor; a comparator coupled to the feedback resistor so as to receive the first feedback voltage and configured to compare the first feedback voltage with a predetermined first reference voltage; and a booster configured to pump charge to the output sampling node in response to the comparator indicating that the first feedback voltage is less than the first reference voltage; and a current limiting portion that is configured to automatically become active when an over-time averaged current drawn to the load is detected to exceed a predetermined first current magnitude, the drawn averaged current being one drawn to the load when the load is episodically connected to receive current from the power supply; wherein the voltage maintaining portion is configured to automatically stop producing the first feedback voltage when the drawn averaged current exceeds the first current magnitude; and wherein the current limiting portion is configured to supply a sampling current to the feedback resistor when the current limiting portion becomes active, the sampling current being representative of a magnitude of the drawn averaged current and causing a second feedback voltage to develop at the feedback resistor such that the booster stops pumping charge to the output sampling node in response to the comparator indicating that the second feedback voltage is equal to or greater than the first reference voltage. The TOF determining system may be one wherein: the power supply is configured to alternatingly and between its supplying of replenishing current to the first said capacitor, to supply replenishing current to one or more additional capacitors, each having a corresponding additional semiconductive light emitter connected to it to draw corresponding high powered surges of current from the corresponding capacitor.

The technology disclosed herein may include that which is described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of supplying power to a load that becomes episodically disconnected and then re-connected to draw current from a multi-mode regulated power supply and from a charge storage device at plural times which are unpredictable to the multi-mode regulated power supply, the method comprising:
   automatically detecting if on a time averaged basis, more than a predetermined first amount of average current is being drawn from the multi-mode regulated power supply, and if not, responsively causing the charge storage device to be charged by the multi-mode regulated power supply to a predetermined first voltage by use of a voltage controlled mode of the multi-mode regulated power supply, where the load is one that becomes episodically connected to draw current from the charge storage device at a same time that the load becomes episodically connected to receive current from the multi-mode regulated power supply;
   in response to detecting that on the time averaged basis more than the predetermined first amount of average current is being drawn from the multi-mode regulated power supply, automatically switching the multi-mode regulated power supply to a current regulating mode to thereby limit the amount of average current that can be drawn from the multi-mode regulated power supply to a second amount of average current, the second amount being greater than the first amount of average current; and
   in response to detecting that on the time averaged basis less than the predetermined first amount of average current is being drawn from the multi-mode regulated power supply, automatically switching the multi-mode regulated power supply to the voltage controlled mode to thereby cause the charge storage device to again be charged by the multi-mode regulated power supply to the predetermined first voltage.

2. The method of claim 1 and further comprising:
   automatically switching the multi-mode regulated power supply back to a current regulating mode upon again detecting that the time averaged current being drawn from the multi-mode regulated power supply is again more than the predetermined first amount of average current.

3. The method of claim 1 wherein:
the charge storage device includes a capacitor; and
the load includes a temperature and voltage sensitive device that provides an output where the output behavior of the device is more so determined by current levels passing therethrough than by its temperature and by corresponding voltages that develop across the temperature and voltage sensitive device.

4. The method of claim 3 wherein:
the temperature and voltage sensitive device includes a semiconductive light emitter whose output luminance is more so determined by current levels that it receives rather than by its temperature and by corresponding voltages that develop across the semiconductive light emitter.

5. The method of claim 4 wherein:
the semiconductive light emitter is one that needs to receive an episodic surge of current of 0.5 Ampere or more to produce an application adequate output luminance.

6. The method of claim 1 wherein:
the load is connected in series with a semiconductive switching device and the load episodically becomes connected to draw current from the multi-mode regulated power supply due to episodic closing and opening of the semiconductive switching device, the method further comprising:
causing the semiconductive switching device to close and open, the closing of the semiconductive switching device occurring in 10 nanoseconds (10 ns) or less.

7. The method of claim 1 wherein the causing of the charge storage device to be charged to the predetermined first voltage while using the voltage controlled mode comprises:
generating a feedback voltage that is a predetermined amount less than an output voltage produced by the multi-mode regulated power supply;
applying the feedback voltage to a feedback resistor;
comparing the feedback voltage with a reference voltage; and
in response to detecting that the feedback voltage is equal to or greater than the reference voltage, deactivating a voltage booster that generates the output voltage produced by the multi-mode regulated power supply.

8. The method of claim 7 wherein the generating of the feedback voltage comprises:
passing a feedback current through the feedback resistor; and
passing the feedback current through a first voltage sensitive device having a respective first threshold voltage, where the first voltage sensitive device switches from a relatively low resistance mode to a substantially higher resistance mode when voltage across the first voltage sensitive device drops below the first threshold voltage;
wherein during the voltage controlled mode, the voltage sensitive device operates just above its threshold voltage; and
wherein the load, when reconnected to draw current, is coupled so as to divert at least a predetermined amount of current away from flowing through the voltage sensitive device, where the diverting away of the at least predetermined amount of current causes the voltage sensitive device to switch into operating below its threshold voltage and thus to switch into operating in its substantially higher resistance mode.

9. The method of claim 8 wherein the switching of the multi-mode regulated power supply to the current regulating mode comprises:
producing a sampling current that is representative of a magnitude of the time averaged current drawn from the multi-mode regulated power supply; and
passing the sampling current through the feedback resistor.

10. The method of claim 8 and further comprising:
passing the feedback current through a second voltage sensitive device having a respective second threshold voltage, where the second voltage sensitive device respectively switches from a second relatively low resistance mode to a second substantially higher resistance mode when voltage across the second voltage sensitive device drops below the second threshold voltage, the second voltage sensitive device being connected in series with the first voltage sensitive device.

11. The method of claim 10 wherein:
the first voltage sensitive device includes a reverse biased Zener diode; and
the second voltage sensitive device includes a forward biased diode.

12. The method of claim 1 and further comprising:
causing the load to become episodically connected to receive current from the multi-mode regulated power supply by commanding a firing of a rapid train of pulses each having a pulse duration of 50 nanoseconds or less.

13. The method of claim 1 wherein:
the time averaged current drawn from the multi-mode regulated power supply is passed through an output inductor of the multi-mode regulated power supply.

14. The method of claim 13 wherein:
the output inductor is part of a low pass output filter of the multi-mode regulated power supply which further includes a capacitor.

15. The method of claim 1 wherein:
the multi-mode regulated power supply includes a digitally controlled voltage boosting module that when activated, pumps a predetermined amount of boosting current and when deactivate does not pump out boosting current; and
the automatic switching of the multi-mode regulated power supply to the current regulating mode includes digitally controlling the voltage boosting module based on sensing of the average current being drawn from the multi-mode regulated power supply.

16. The method of claim 15 wherein:
the automatic switching of the multi-mode regulated power supply to the voltage controlled mode includes digitally controlling the voltage boosting module based on sensing whether a voltage sensitive nonlinear device is operating above or below a threshold voltage of that voltage sensitive nonlinear device.

17. The method of claim 16 wherein:
the voltage sensitive nonlinear device includes a reverse biased Zener diode.

18. The method of claim 16 wherein:
the voltage sensitive nonlinear device includes a forward biased diode operating either just above or below its threshold voltage.

19. A method of supplying power to a capacitor and to a load that repeatedly starts and stops drawing charge from the capacitor, the method comprising:

first sensing that the load is drawing charge and responsively supplying a regulated current to the capacitor; and second sensing that the load has stopped drawing charge and responsively supplying a regulated voltage to the capacitor.

20. The method of claim 19 wherein said responsive supplying of the regulated voltage comprises:

detecting whether a voltage sensitive nonlinear device is operating above or below a threshold voltage of that voltage sensitive nonlinear device; and in response to detecting that the voltage sensitive nonlinear device is operating below the threshold voltage and in response to said second sensing that the load has stopped drawing charge, turning on a charge pump that pumps charge to the capacitor.

\* \* \* \* \*